(12) United States Patent
Takabatake

(10) Patent No.: US 7,366,129 B2
(45) Date of Patent: *Apr. 29, 2008

(54) COMMUNICATION NODE FOR ENABLING INTERWORKING OF NETWORK USING REQUEST/RESPONSE BASED DATA TRANSFER AND NETWORK USING NON-REQUEST/RESPONSE BASED DATA TRANSFER

(75) Inventor: Toshiaki Takabatake, Kanagawa-ken (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 808 days.

This patent is subject to a terminal disclaimer.

(21) Appl. No.: 10/773,324

(22) Filed: Feb. 9, 2004

(65) Prior Publication Data

US 2004/0156375 A1   Aug. 12, 2004

Related U.S. Application Data

(63) Continuation of application No. 09/472,812, filed on Dec. 28, 1999, now Pat. No. 6,728,244.

(30) Foreign Application Priority Data

Dec. 28, 1998 (JP) ............................... 10-372736

(51) Int. Cl.
*H04Q 7/00* (2006.01)
*H04B 7/216* (2006.01)
*H04L 12/56* (2006.01)
*H04J 3/16* (2006.01)
*H04N 7/18* (2006.01)
*H04L 12/413* (2006.01)

(52) U.S. Cl. ...................... 370/328; 370/335; 370/338; 370/342; 370/392; 370/463; 370/466; 725/74

(58) Field of Classification Search .................. 725/74
See application file for complete search history.

(56) References Cited

U.S. PATENT DOCUMENTS

| 6,178,170 B1 | 1/2001 | Duree et al. |
| 6,349,352 B1 | 2/2002 | Lea |
| 6,496,860 B2 | 12/2002 | Ludtke et al. |
| 6,523,696 B1 | 2/2003 | Saito et al. |
| 6,728,244 B1* | 4/2004 | Takabatake .................. 370/392 |
| 6,944,145 B2* | 9/2005 | Takabatake .................. 370/335 |

* cited by examiner

*Primary Examiner*—Melanie Jagannathan
(74) *Attorney, Agent, or Firm*—Oblon, Spivak, McClelland, Maier & Neustadt, P.C.

(57) ABSTRACT

A communication node for enabling interworking of a first network in which data transfer is based on a combination of request and response and a second network in which data transfer is not based on a combination of request and response is disclosed. In the communication node, a packet conversion processing is applied to a first packet received by the first interface on the first network side so as to obtain a second packet corresponding to the second network at a time of executing an application across the first network and the second network, and a correspondence between the first packet and the second packet is stored in a packet correspondence memory. Then, a destination node on the first network to which a response packet is to be transferred is identified by referring to the packet correspondence memory using an information of the response packet at a time of receiving the response packet corresponding to the second packet by the second interface on the second network.

24 Claims, 12 Drawing Sheets

FIG.7

| AV/C COMMAND No. | IEEE 1394 SIDE | IEEE 802.11 SIDE |
|---|---|---|
| COMMAND #1 | Node_ID=1, Tran._ID=a | Ctype=control SubUnit_Type=VTR SubUnit_ID=X1, MAC Address=X |
| COMMAND #2 | Node_ID=1, Tran._ID=b | Ctype=status SubUnit_Type=Tuner SubUnit_ID=X2, MAC Address=X |
| COMMAND #3 | Node_ID=3, Tran._ID=c | Ctype=control SubUnit_Type=Disk SubUnit_ID=Y1, MAC Address=Y |
| ⋮ | ⋮ | ⋮ |

COMMUNICATION NODE FOR ENABLING INTERWORKING OF NETWORK USING REQUEST/RESPONSE BASED DATA TRANSFER AND NETWORK USING NON-REQUEST/RESPONSE BASED DATA TRANSFER

This application is based upon and claims the benefit of priority from the prior Japanese Patent Application No. 10-372736, filed Dec. 28, 1998, and from U.S. application Ser. No. 09/472,812, filed Dec. 28, 1999, the entire contents of which are incorporated herein by reference.

BACKGROUND OF THE INVENTION

1. Field of the Invention

The present invention relates to a communication node for realizing data transfer between interconnected different networks by identifying packets on each network, managing correspondences of packets between different networks, and converting packets.

2. Description of the Background Art

In recent years, a new specification of serial bus called IEEE 1394 that has been developed as a next generation version of SCSI (Small Computer System Interface) is attracting much attention. The IEEE 1394 bus is capable of connecting a plurality of terminals in daisy chain or star connection and transfer wideband data in excess of 100 Mbps. Also, it has a major feature that it is possible to transmit both asynchronous data and isochronous data on the same cable.

For this reason, even though the IEEE 1394 was originally developed as a next generation version of SCSI, there are increasing trends to use the IEEE 1394 as a cable for connecting AV devices. Namely, there is a proposition that the large capacity data such as image and speech information that are conventionally transferred by analog signals between AV devices can be transferred by digital signals using the isochronous data transfer function of the IEEE 1394. The IEEE 1394 is very attractive because it also has a function for connection to digital devices such as PC using the asynchronous data transfer function, in addition to the function for large capacity real time data transfer between AV devices.

As such, the IEEE 1394 has both the AV data transfer function and the data communication function, so that it is now regarded as the most promising candidate medium for home networks. Already, protocols such as a control protocol for controlling AV devices connected by the IEEE 1394 bus and a protocol for resource reservation on the IEEE 1394 bus have been specified, so that the basic framework for utilizing the IEEE 1394 bus as the home network has been nearly completed.

In addition, discussions of a scheme for extending transfer of AV data transferred on the IEEE 1394 to a radio environment have also started. In particular, it has been specified that the IEEE 1394 will be utilized for redistribution of broadcast type services within homes, such as transfer of image information broadcast by digital satellite broadcasting or digital terrestrial broadcasting that is expected to start providing services in near future, through the IEEE 1394 bus to a radio network. In this case, factors required for the radio network include a capability to realize a transmission rate exceeding 10 Mbps, a use of wavelength that can penetrate through walls of homes, and a potential for keeping its cost low.

Currently, in Japan, a proposition to allow free use of radio frequencies in 5 GHz band which is a frequency band that can satisfy these requirements has been made by the Ministry of Posts and Telecommunications, and concrete forms of utilization of the 5 GHz band have been discussed by ARIB (Association of Radio Industries and Business), where topics of discussions include a form of utilization in homes. However, the radio LAN has already been designated as the basic form of utilization of this 5 GHz band radio frequencies, so that the specification under discussion is also based on IEEE 802.11 (see IEEE Standards for "Wireless LAN Medium Access Control (MAC) and Physical layer (PHY) Specification", for example) which is the standard specification of the radio LAN.

In the case of connecting the IEEE 1394 bus and the radio network, whether or not protocols for AV control that are designed to be executed on the IEEE 1394 bus can really be executable on the radio network may pose a problem. One of the features of the IEEE 1394 bus is that its data transfer is based on a combination of request and response. In contrast, in the radio LAN such as the IEEE 802.11, a MAC protocol such as CSMA/CA (Carrier Sense Multiple Access with Collision Detection) is basically used so that there is no guarantee that it is possible to realize the data transfer based on a combination of request and response.

Also, in the case of carrying out the AV data transfer on the IEEE 1394 bus, it is also necessary to execute the AV/C protocol (see AV/C Digital Interface Command Set General Specification, IEEE 1394-1995, for example) which is the control protocol for the IEEE 1394. This AV/C protocol basically presupposes execution on the IEEE 1394, so that its transfer protocol for control commands (such as "play", "stop", "fast forward" commands, for example) also requires execution of a command transmission and a response reception as one set.

FIG. 1 shows an outline of the AV/C protocol execution sequence.

The command/response in the AV/C protocol are required to be transferred by Write_Request packets of the IEEE 1394, so that Write_Request packets are used for transfer of an AV/C command from a Controller node 1001 to a Target node 1003 and transfer of an AV/C response from the Target node 1003 to the Controller node 1001 shown in FIG. 1.

Also, the AV/C protocol requires transmission of commands to functional elements in the Target node 1003 (VTR Sub Unit 1031 and Tuner Sub Unit 1032 in FIG. 1) so that an FCP (Function Control Protocol) frame for carrying the AV/C command is allocated with a field for describing an identifier for identifying a destination functional element.

In addition, a processing time since the Target node 1003 received the AV/C command until the processing corresponding to the received command is executed and the AV/C response is returned to the Controller node 1001 is within 100 msec.

FIG. 2 shows packet formats in the case of transferring AV control commands defined in the AV/C protocol on Asynchronous packets on the IEEE 1394 (see ISO-IEC 61883, for example).

On the IEEE 1394 bus, a device to be controlled that received the AV/C command is required to return a header information of the FCP frame of the received AV/C command without any change to a controlling device that has transmitted the AV/C command, in order to establish a correspondence between the AV/C command and its response. In this way, the controlling device can determine an AV/C command transmitted by the own device that corresponds to the received AV/C response.

As mentioned above, in the case of extending transfer of AV data transferred on the IEEE 1394 bus to the radio network, it is also necessary to execute the above described AV/C protocol on the radio network. However, in this case, it is also necessary to execute the packet conversion processing for packets that are transferring AV/C commands at a connection point (such as a base station node (or access point)) between these networks.

For this reason, if the correspondence between the AV/C command that is transmitted via the base station node and the AV/C response that is received at the base station node is not known, it becomes impossible to determine a node on the IEEE 1394 bus to which the received AV/C response is to be transferred. In particular, in the current specification of the IEEE 802.11, no function for uniquely specifying such correspondences between commands and responses at a network level is defined. Consequently, when the AV/C command is transmitted from the base station node (Coordination Point) in the IEEE 802.11 network to the IEEE 802.11 terminal, there is a problem in that it is impossible to identify the earlier transmitted AV/C command which corresponds to the later received AV/C response.

As described, in an attempt to merge a network in which the data transfer is based on a combination of request and response such as the IEEE 1394 bus on which the AV/C protocol is executed with a network in which the data transfer is not based on a combination of request and response such as the IEEE 802.11, there is a problem that, even when there is a need to manage a correspondence between transfer data from a node on the former network to the latter network and transfer data from a node on the latter network to the former network, it has been impossible to maintain this correspondence so that it has been difficult to construct such a merged network.

For example, in the case of extending the AV device control protocol (AV/C protocol) executed on the IEEE 1394 bus (wired network) to the IEEE 802.11 network (radio network), there is a need to maintain the correspondence between the AV/C command and the AV/C response on the radio network as well. However, the IEEE 802.11 network has no function for maintaining such a correspondence between request and response as its MAC layer function, so that it has been difficult to construct a network merging the IEEE 1394 bus and the IEEE 802.11 network.

SUMMARY OF THE INVENTION

It is therefore an object of the present invention to provide a communication node capable of enabling interworking of a network in which data transfer is based on a combination of request and response and a network in which data transfer is not based on a combination of request and response.

It is another object of the present invention to provide a communication node capable of enabling interworking by which a plurality of applications defined on the IEEE 1394 bus are executed on the radio network as well, in a network environment in which the radio network and the IEEE 1394 bus coexist.

It is another object of the present invention to provide a communication node capable of enabling interworking of the IEEE 1394 bus and the radio network such that a protocol such as AV/C protocol which is executed by a combination of command and response can also be executed on the radio network such as the IEEE 802.11 LAN.

According to one aspect of the present invention there is provided a communication node, comprising: a first network interface for a first network in which data transfer is based on a combination of request and response; a second network interface for a second network in which data transfer is not based on a combination of request and response; a packet conversion processing unit configured to apply a packet conversion processing to a first packet received by the first interface and obtain a second packet corresponding to the second network at a time of executing an application across the first network and the second network; a packet correspondence memory unit configured to store a correspondence between the first packet and the second packet; and a destination node identification unit configured to identify a destination node on the first network to which a response packet is to be transferred, by referring to the packet correspondence memory unit using an information of the response packet at a time of receiving the response packet corresponding to the second packet by the second interface.

According to another aspect of the present invention there is provided a communication node, comprising: a first network interface for a first network in which data transfer is based on a combination of request and response; a second network interface for a second network in which data transfer is not based on a combination of request and response; a packet conversion processing unit configured to apply a packet conversion processing to a first packet received by the first interface and obtain a second packet corresponding to the second network at a time of executing an application across the first network and the second network; a packet information memory unit configured to store an information on each second packet transmitted from the communication node; and a packet transmission control unit configured to serialize transmission of a plurality of second packets to the second network by referring to the packet information memory unit such that after one second packet is transmitted to the second network, a next second packet is not transmitted to the second network until a response packet corresponding to said one second packet is received from the second network.

According to another aspect of the present invention there is provided a communication node, comprising: a first network interface for a first network in which data transfer is based on a combination of request and response; a second network interface for a second network in which data transfer is not based on a combination of request and response; a packet conversion processing unit configured to apply a packet conversion processing to a first packet received by the first interface and obtain a second packet corresponding to the second network at a time of executing an application across the first network and the second network; a packet correspondence memory unit configured to store a correspondence between the first packet and the second packet; a destination node identification unit configured to identify a destination node on the first network to which a response packet is to be transferred, by referring to the packet correspondence memory unit using an information of the response packet at a time of receiving the response packet corresponding to the second packet by the second interface; a packet information memory unit configured to store an information on each second packet transmitted from the communication node; a packet transmission control unit configured to serialize transmission of a plurality of second packets to the second network by referring to the packet information memory unit such that after one second packet is transmitted to the second network, a next second packet is not transmitted to the second network until a response packet corresponding to said one second packet is received from the second network; and a node processing determining unit configured to determine a processing to be executed by the communication node as either a first processing using a combination of the packet correspondence memory unit and the destination node identification unit or a second processing using a combination of the packet information memory unit and the packet transmission control unit, according to a type of the first packet.

According to another aspect of the present invention there is provided a computer usable medium having computer readable program codes embodied therein for causing a computer to function as a communication node having a first network interface for a first network in which data transfer is based on a combination of request and response and a second network interface for a second network in which data transfer is not based on a combination of request and response, the computer readable program codes include: a first computer readable program code for causing said computer to apply a packet conversion processing to a first packet received by the first interface and obtain a second packet corresponding to the second network at a time of executing an application across the first network and the second network; a second computer readable program code for causing said computer to store a correspondence between the first packet and the second packet in a packet correspondence memory; and a third computer readable program code for causing said computer to identify a destination node on the first network to which a response packet is to be transferred, by referring to the packet correspondence memory using an information of the response packet at a time of receiving the response packet corresponding to the second packet by the second interface.

According to another aspect of the present invention there is provided a computer usable medium having computer readable program codes embodied therein for causing a computer to function as a communication node having a first network interface for a first network in which data transfer is based on a combination of request and response and a second network interface for a second network in which data transfer is not based on a combination of request and response, the computer readable program codes include: a first computer readable program code for causing said computer to apply a packet conversion processing to a first packet received by the first interface and obtain a second packet corresponding to the second network at a time of executing an application across the first network and the second network; a second computer readable program code for causing said computer to store an information on each second packet transmitted from the communication node in a packet information memory; and a third computer readable program code for causing said computer to serialize transmission of a plurality of second packets to the second network by referring to the packet information memory such that after one second packet is transmitted to the second network, a next second packet is not transmitted to the second network until a response packet corresponding to said one second packet is received from the second network.

According to another aspect of the present invention there is provided a computer usable medium having computer readable program codes embodied therein for causing a computer to function as a communication node having a first network interface for a first network in which data transfer is based on a combination of request and response and a second network interface for a second network in which data transfer is not based on a combination of request and response, the computer readable program codes include: a first computer readable program code for causing said computer to apply a packet conversion processing to a first packet received by the first interface and obtain a second packet corresponding to the second network at a time of executing an application across the first network and the second network; a second computer readable program code for causing said computer to store a correspondence between the first packet and the second packet in a packet correspondence memory; a third computer readable program code for causing said computer to identify a destination node on the first network to which a response packet is to be transferred, by referring to the second computer readable program code using an information of the response packet at a time of receiving the response packet corresponding to the second packet by the second interface; a fourth computer readable program code for causing said computer to store an information on each second packet transmitted from the communication node in a packet information memory; a fifth computer readable program code for causing said computer to serialize transmission of a plurality of second packets to the second network by referring to the fourth computer readable program code such that after one second packet is transmitted to the second network, a next second packet is not transmitted to the second network until a response packet corresponding to said one second packet is received from the second network; and a sixth computer readable program code for causing said computer to determine a processing to be executed by the communication node as either a first processing using a combination of the packet correspondence memory and the third computer readable program code or a second processing using a combination of the packet information memory and the fifth computer readable program code, according to a type of the first packet.

According to another aspect of the present invention there is provided a method for controlling a communication node having a first network interface for a first network in which data transfer is based on a combination of request and response and a second network interface for a second network in which data transfer is not based on a combination of request and response, the method comprising: applying a packet conversion processing to a first packet received by the first interface and obtaining a second packet corresponding to the second network at a time of executing an application across the first network and the second network; storing a correspondence between the first packet and the second packet in a packet correspondence memory; and identifying a destination node on the first network to which a response packet is to be transferred, by referring to the packet correspondence memory using an information of the response packet at a time of receiving the response packet corresponding to the second packet by the second interface.

According to another aspect of the present invention there is provided a method for controlling a communication node having a first network interface for a first network in which data transfer is based on a combination of request and response and a second network interface for a second network in which data transfer is not based on a combination of request and response, the method comprising: applying a packet conversion processing to a first packet received by the first interface and obtaining a second packet corresponding to the second network at a time of executing an application across the first network and the second network; storing an information on each second packet transmitted from the communication node in a packet information memory; and serializing transmission of a plurality of second packets to the second network by referring to the packet information memory such that after one second packet is transmitted to the second network, a next second packet is not transmitted to the second network until a response packet corresponding to said one second packet is received from the second network.

According to another aspect of the present invention there is provided a method for controlling a communication node having a first network interface for a first network in which data transfer is based on a combination of request and response and a second network interface for a second network in which data transfer is not based on a combination of request and response, the method comprising: applying a packet conversion processing to a first packet received by the first interface and obtaining a second packet corresponding to the second network at a time of executing an application across the first network and the second network; storing a correspondence between the first packet and the second packet in a packet correspondence memory; identifying a destination node on the first network to which a response packet is to be transferred, by referring to the packet correspondence memory using an information of the response packet at a time of receiving the response packet corresponding to the second packet by the second interface; storing an information on each second packet transmitted from the communication node in a packet information memory; serializing transmission of a plurality of second packets to the second network by referring to the packet information memory such that after one second packet is transmitted to the second network, a next second packet is not transmitted to the second network until a response packet corresponding to said one second packet is received from the second network; and determining a processing to be executed by the communication node as either a first processing using a combination of the packet correspondence memory and the identifying step or a second processing using a combination of the packet information memory and the serializing step, according to a type of the first packet.

Other features and advantages of the present invention will become apparent from the following description taken in conjunction with the accompanying drawings.

BRIEF DESCRIPTION OF THE DRAWINGS

FIG. 7 is a diagram showing an exemplary format of a correspondence table to be maintained by a communication node according to the first embodiment of the present invention.

DETAILED DESCRIPTION OF THE PREFERRED EMBODIMENTS

Referring now to FIG. 3 to FIG. 12, preferred embodiments of a communication node according to the present invention will be described in detail.

In the following, an exemplary case of a home network in which the IEEE 1394 bus provided in a home is connected with a radio terminal using a radio interface through the communication node of the present invention will be mainly described.

First Embodiment

Figure 1:
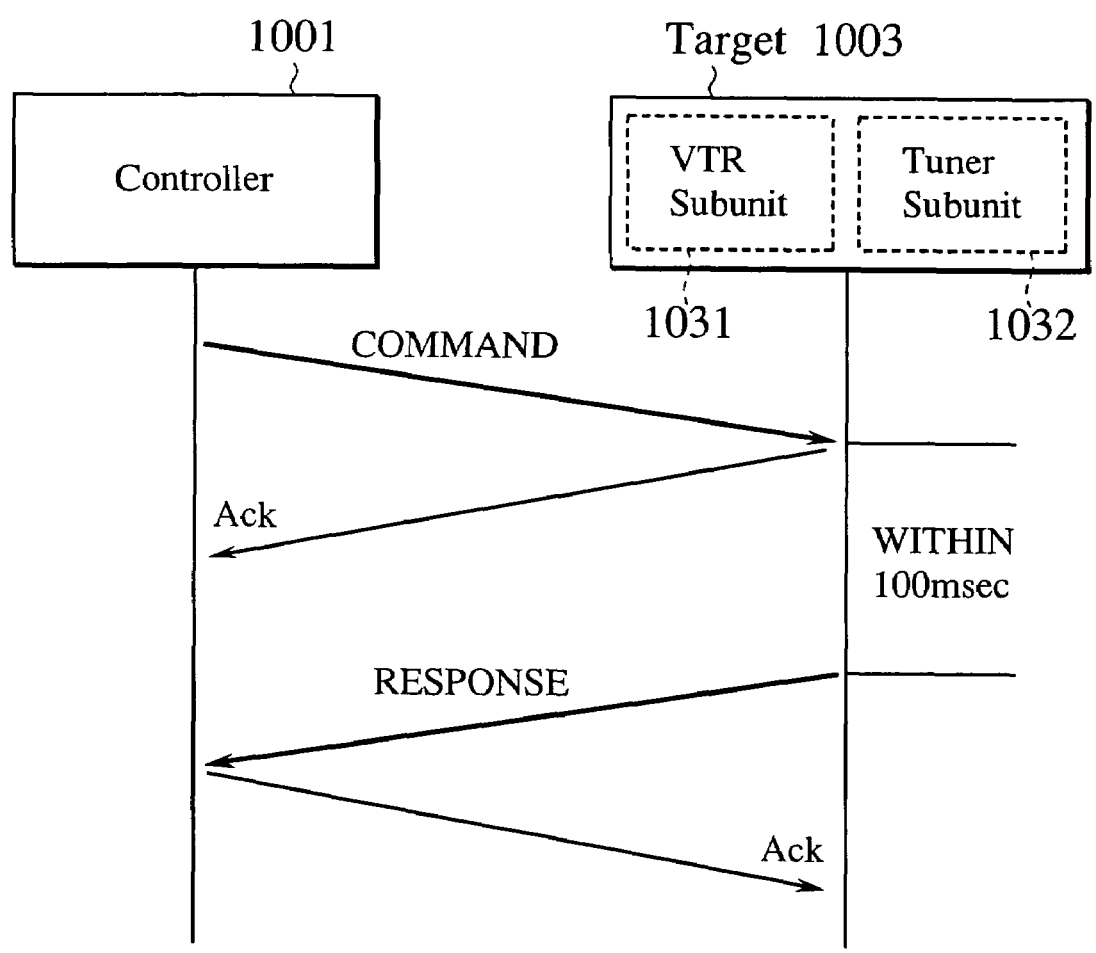
FIG. 1 is a sequence chart showing a conventionally known processing procedure of an AV/C protocol.
Figure 2:
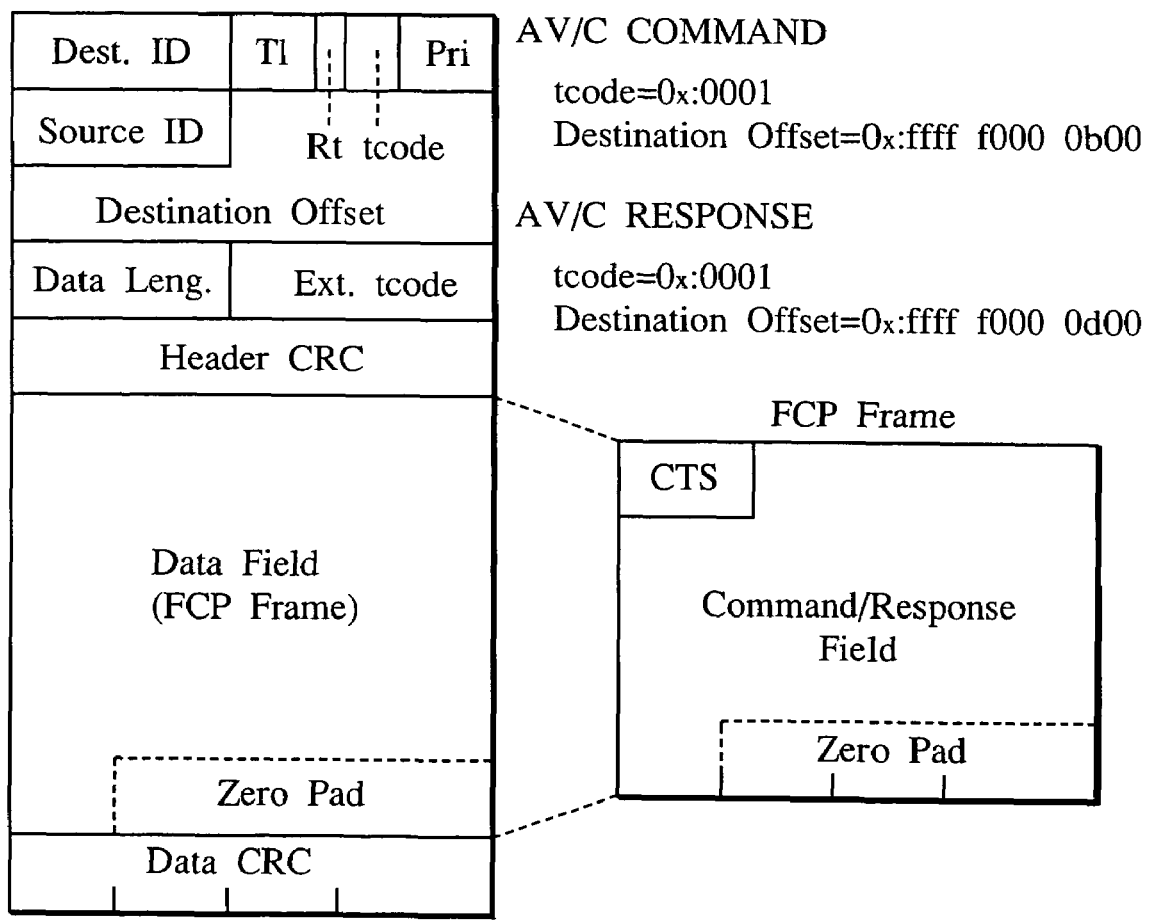
FIG. 2 is a diagram showing an exemplary conventional packet configuration on an IEEE 1394 bus used in transferring AV/C command/response.
Figure 3:
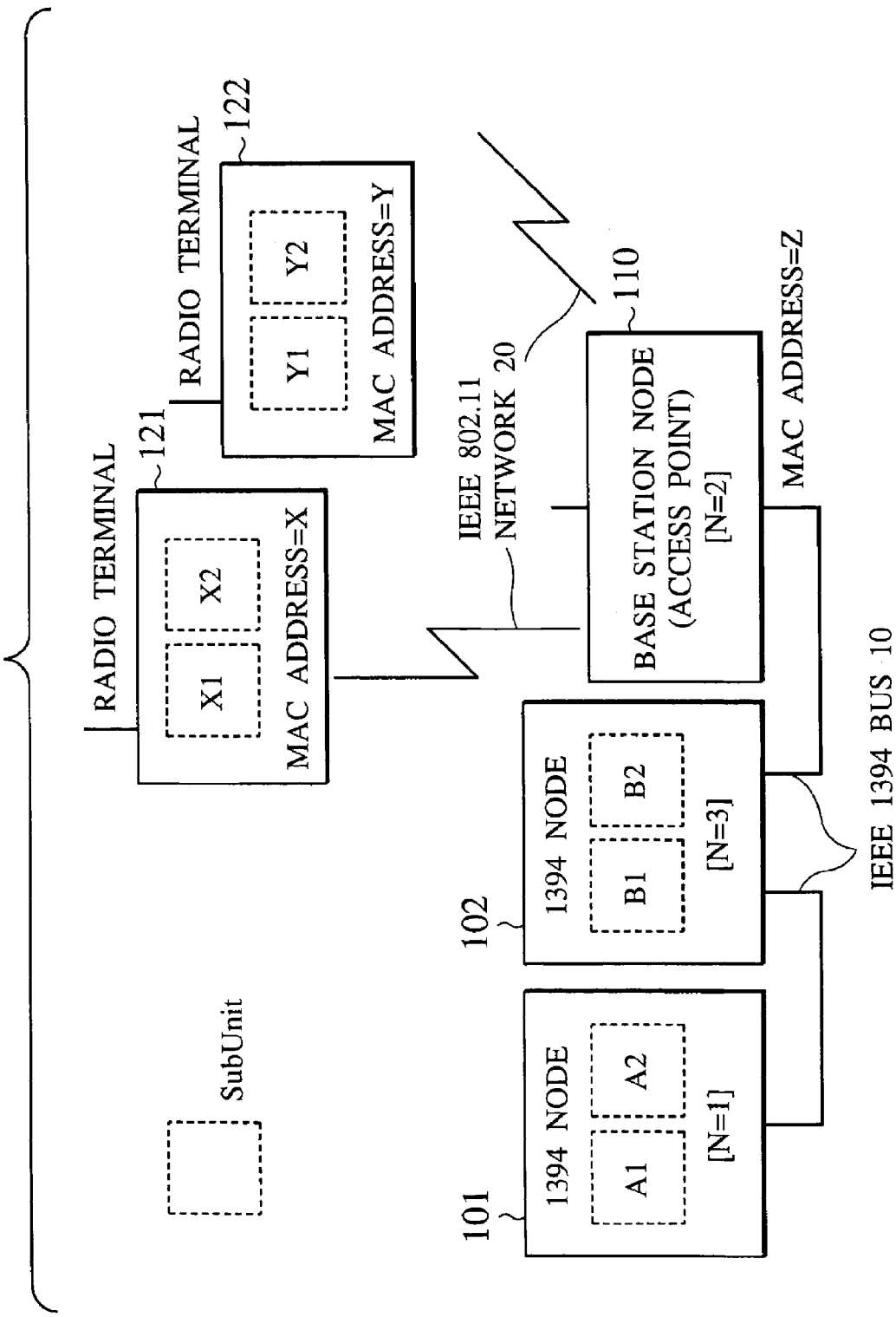
FIG. 3 is a schematic diagram showing an exemplary overall configuration of a home network using a communication node according to the present invention.

FIG. 3 shows an exemplary overall configuration of a home network using the IEEE 1394 bus as a wired network and the IEEE 802.11 network as a radio network according to the first embodiment.

In FIG. 3, a plurality of 1394 nodes are connected on the IEEE 1394 bus 10, and among them the 1394 nodes 101 and 102 are nodes that have a 1394 interface alone so that they are connected to the IEEE 802.11 network 20 through a base station node (access point) 110 which is the communication node according to the present invention. Also, on the IEEE 802.11 network 20, there are radio terminals 121 and 122 that have a radio interface.

In the AV/C protocol, 1394 nodes having a 1394 interface are recognized in terms of "Unit", while constituent elements within a 1394 node (such as a cassette tap player section or a CD player section of an audio system, for example) are recognized in terms of "Sub Unit". In this embodiment, it is assumed that the 1394 nodes on the IEEE 1394 bus and the radio terminals on the IEEE 802.11 network do not recognize each other directly, but constituent elements (Sub Units in the AV/C protocol) within each 1394 node and each radio terminal recognize each other and then the AV/C protocol is executed between the 1394 node on the IEEE 1394 bus and the radio terminal on the IEEE 802.11 network.

For example, in an exemplary configuration of FIG. 3, the constituent elements (Sub Units) "A1" and "A2" within the 1394 node 101 on the IEEE 1394 bus 10 are recognized from the radio terminal 121 on the IEEE 802.11 network 20 as if they are located in the base station node 110, while the constituent elements (Sub Units) "X1" and "X2" within the radio terminal 121 on the IEEE 802.11 network 20 are recognized from the 1394 node 101 on the IEEE 1394 bus 10 as if they are located in the base station node 110.

This function by which the base station node 110 notifies the constituent elements within a node on one network as the constituent elements within the own node to a node on another network is realized by a constituent element notification function provided in the base station node 110.

In the following, it is assumed that the AV/C protocol is executed between the 1394 node 101 on the IEEE 1394 bus 10 and the radio terminal 121 on the IEEE 802.11 network 20 based on the recognition as described above, and a scheme for identifying transaction on the IEEE 802.11 network 20 at a time of the AV/C protocol execution processing will be described. Note that the above remarks also apply to the second to fourth embodiments described below.

Now, in FIG. 3, a Sub Unit A1 and a Sub Unit A2 are present in the 1394 node 101 and a Sub Unit B1 and a Sub Unit B2 are present in the 1394 node 102 on the IEEE 1394 bus 10. Also, a Sub Unit X1 and a Sub Unit X2 are present in the radio terminal 121 and a Sub Unit Y1 and a Sub Unit Y2 are present in the radio terminal 122 on the IEEE 802.11 network 20.

Also, in FIG. 3, N=1, N=3 and N=2 are assigned respectively to the 1394 node 101, the 1394 node 102, and the base station node 110 as node identifiers of 1394 nodes on the IEEE 1394 bus 10. On the other hand, MAC address=X, MAX address=Y, and MAC address=Z are assigned respectively to the radio terminal 121, the radio terminal 122, and the base station node 110 as MAC addresses on the IEEE 802.11 network 20.

Figure 4:
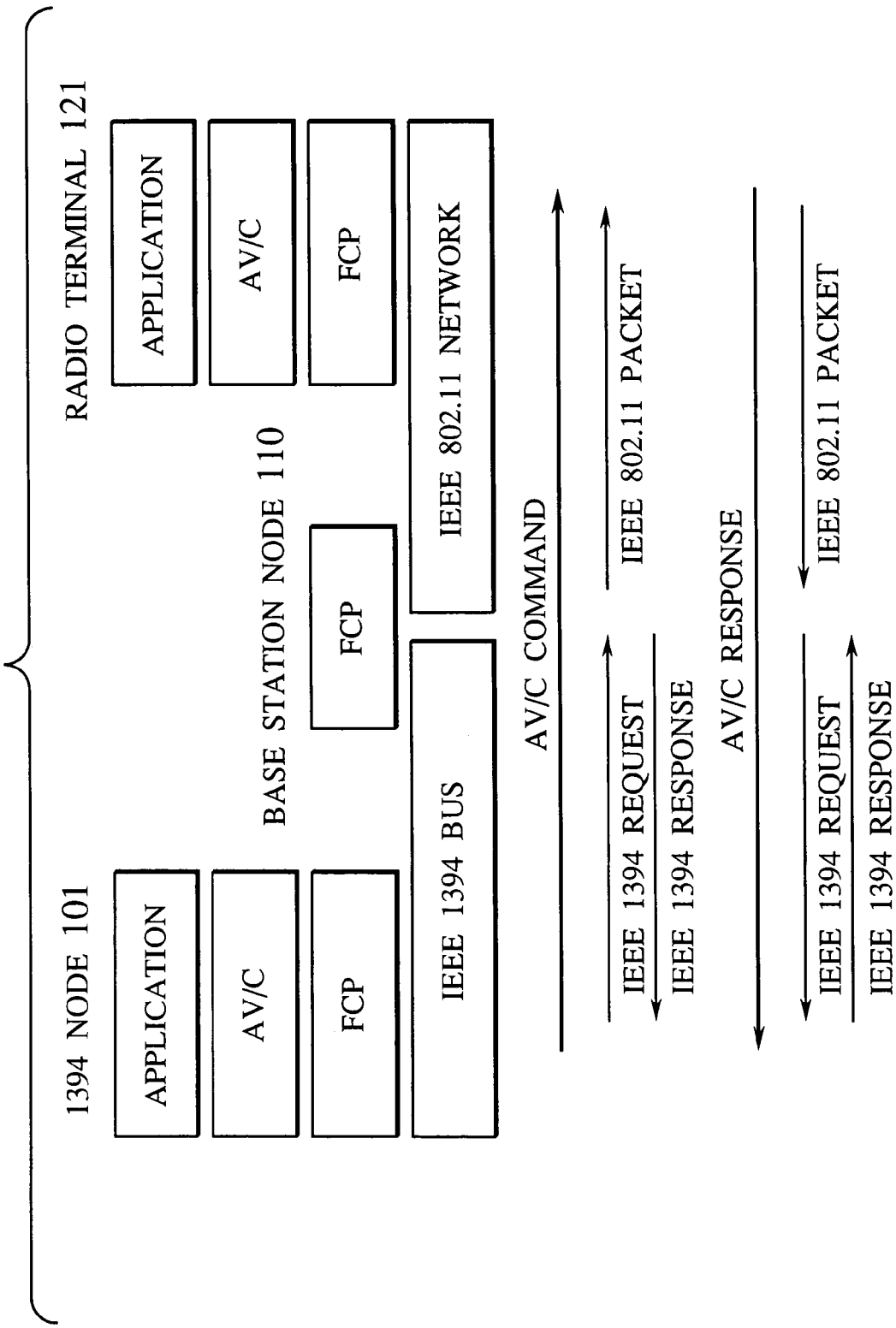
FIG. 4 is a diagram showing an outline of a command/response transfer sequence in the AV/C protocol and an exemplary protocol stack in the case of executing the AV/C protocol used in the present invention.

FIG. 4 shows an outline of the processing sequence in the case where the AV/C protocol is executed in such a configuration, with the 1394 node 101 as a controlling node in the AV/C protocol and the radio terminal 121 as a node to be controlled in the AV/C protocol. FIG. 4 shows an exemplary case in which the 1394 node 101 activates an application for executing the AV/C protocol, and this application executes the AV/C protocol such that an AV/C command is transferred to the radio terminal 121 which is the node to be controlled.

First, the AV/C command to be transmitted from the 1394 node-101 is loaded into an FCP frame, encapsulated into an IEEE 1394 packet (request packet) and then transferred to the base station node 110. When this packet transfer is completed successfully, the base station node 110 returns an Ack (response packet). Next, the base station node 110 recognizes a radio terminal to which the received AV/C command is to be transferred according to the received FCP frame information, and transfers the received AV/C command to the recognized radio terminal (radio terminal 121).

Next, the node to be controlled (radio terminal 121) that received this AV/C command completes a processing corresponding to the received command within 100 msec, and returns a processing execution result for this command to the 1394 node 101 which is the controlling node (AV/C response). Upon receiving this AV/C response packet, the base station node 110 recognizes a 1394 node (1394 node 101) on the IEEE 1394 bus 10 to which this response information is to be transferred according to an information contained in that received packet. When the base station node 110 transfers the received AV/C response information to the recognized 1394 node (1394 node 101) and this transfer is successfully completed, a response packet on the IEEE 1394 bus 10 is returned to the base station node 110.

Figure 5:
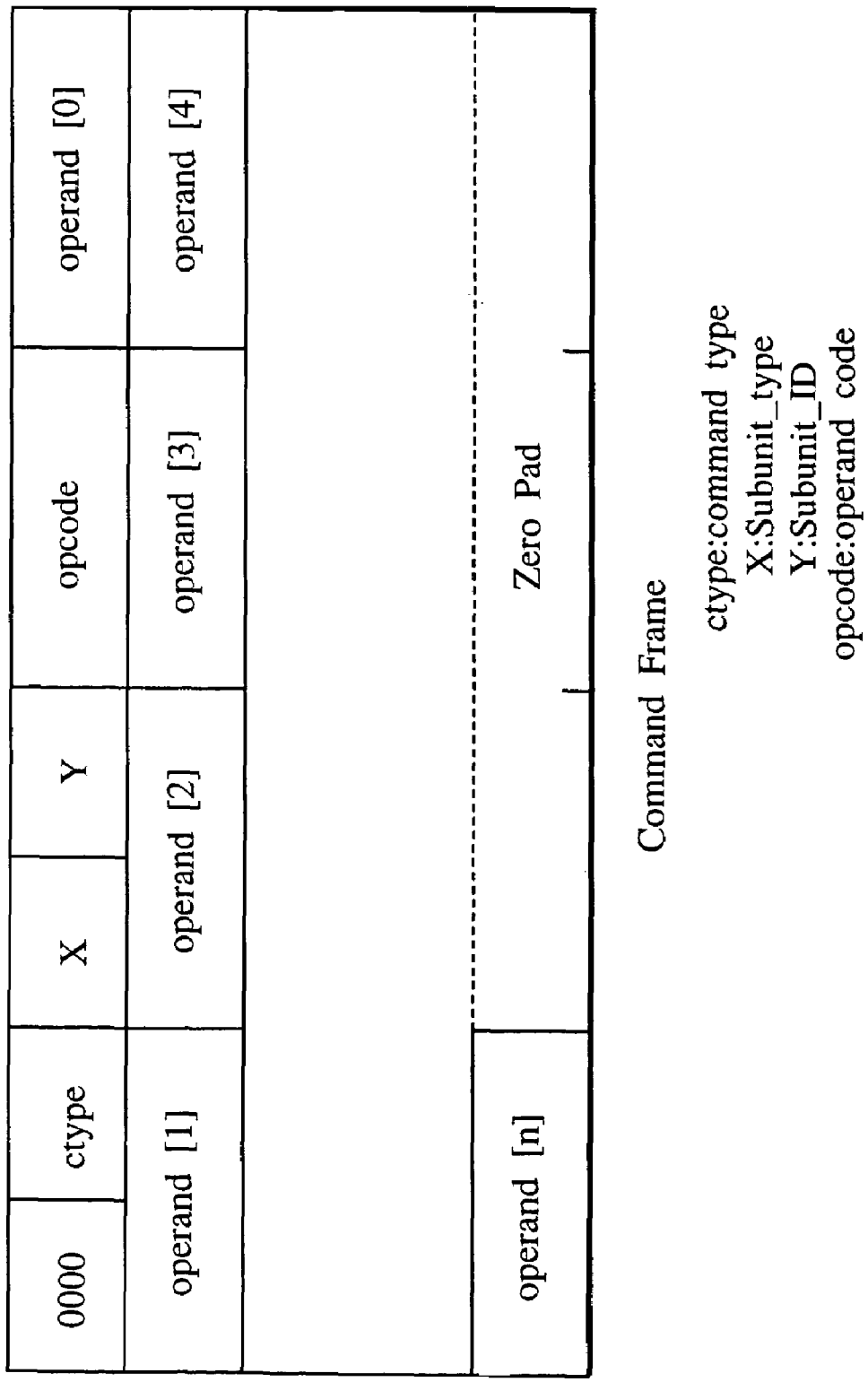
FIG. 5 is a diagram showing an exemplary frame structure of an FCP frame used in the first to third embodiments of the present invention.

Here, what must be resolved is how the base station node 110 ascertains the 1394 node to be a transfer target of the AV/C response. FIG. 5 shows a frame structure of an FCP frame used in the AV/C protocol (see ISO-IEC61883, for example). In the FCP frame, a protocol corresponding to the information loaded in the FCP frame is to be identified by top four bits. Currently, "0000" is allocated to the AV/C protocol. Also, a "ctype" field identifies a type of the AV/C command, a "Subunit_type" field identifies a type of a Sub Unit that is a target of the command, and a "Subunit_ID" field identifies a specific Sub Unit when there are plural Sub Units with the same type of a Sub Unit. Also, "opcode" fields specify specific contents of the AV/C command.

This first embodiment is directed to one method for identifying the AV/C response mentioned above in which an information obtained by combining a MAC address of the radio terminal on the IEEE 802.11 network and a header information of the FCP frame carrying the AV/C command to be transferred is used as an identifier on the IEEE 802.11 network.

Figure 6:
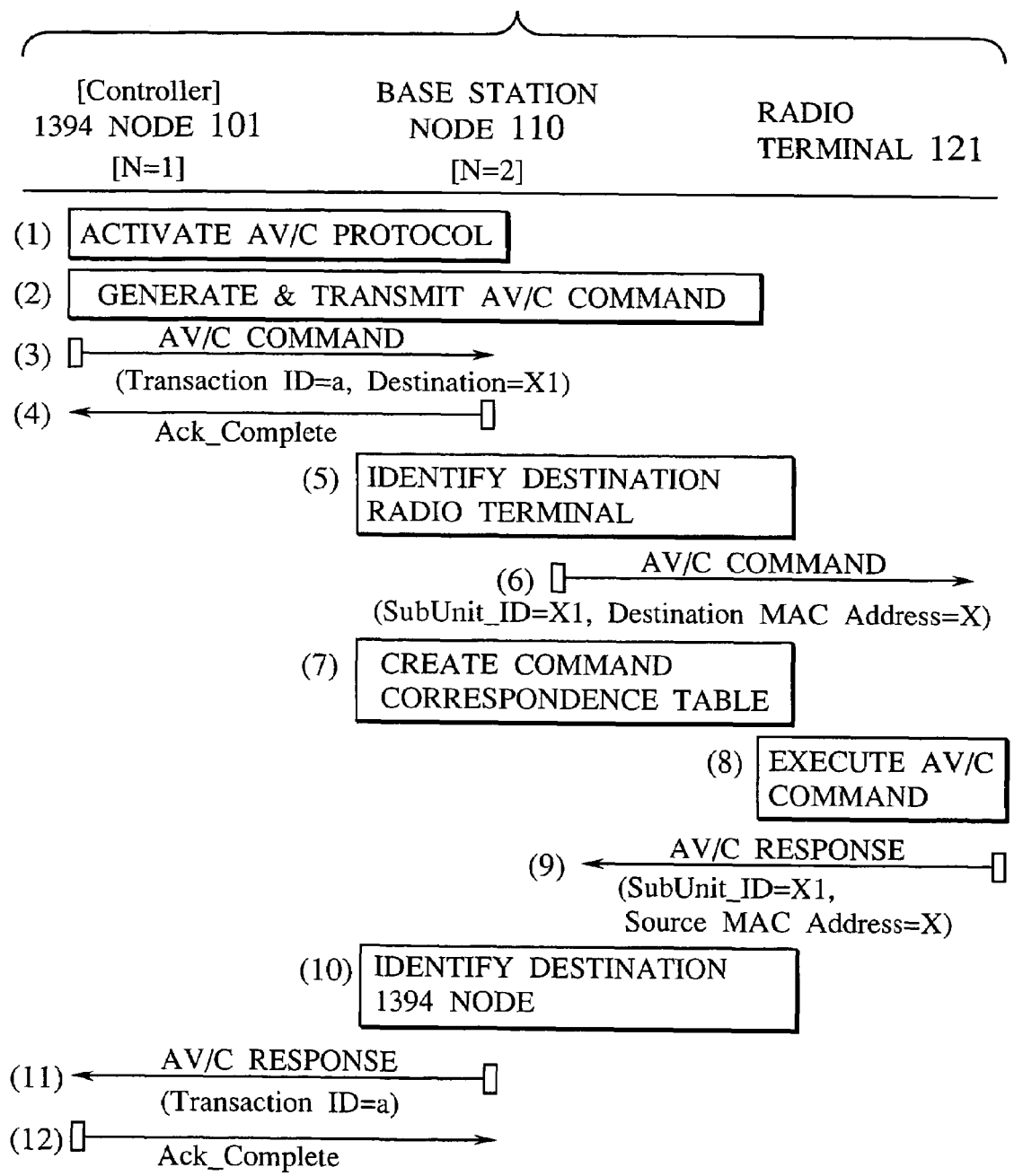
FIG. 6 is a sequence chart for an exemplary processing in the home network of FIG. 3 according to the first embodiment of the present invention.

FIG. 6 shows an exemplary processing sequence for the AV/C protocol in this embodiment, which proceeds as follows.

(1) The application is activated and the AV/C protocol is executed at the 1394 node 101.

(2) The AV/C command is generated and transmitted toward the Sub Unit X1 within the radio terminal 121 at the 1394 node 101.

(3) The FCP frame loaded with the AV/C command is transferred from the 1394 node 101 to the base station node 110. At this point, the transaction_ID=a on the IEEE 1394 bus 10, and the destination Subunit_ID=X1 is described in the FCP frame.

(4) Upon receiving the AV/C command successfully, the base station node 110 returns a corresponding Ack message to the 1394 node 101.

(5) At the base station node 110, it is ascertained that the destination radio terminal is the radio terminal 121, as the destination Subunit_ID of the received AV/C command is X1.

(6) The AV/C command is transferred from the base station node 110 to the radio terminal 121.

(7) At the base station node 110, the fact that the identifier on the IEEE 802.11 network 20 corresponding to the transmitted AV/C command is "FCP header information such as Subunit_ID=X1+MAC address=X", and the fact that the identifier on the IEEE 1394 bus 10 is "transaction_ID=a+1394 node address N=1" are stored, and a correspondence table for them is created.

(8) The radio terminal 121 executes the processing corresponding to the received AV/C command.

(9) The radio terminal 121 generates the AV/C response for notifying the processing result of the executed AV/C command, and transfers it to the base station node 110 after loading it in the FCP frame.

(10) The base station node 110 refers to the above described correspondence table, and ascertains that the received AV/C response corresponds to "transaction_ID=a on the IEEE 1394 bus+1394 node address N=1" from a combination of the header information of the FCP frame carrying the received AV/C response and the MAC address of the source radio terminal.

(11) The base station node 110 transfers the received AV/C response to the 1394 node 101 (N=1). At this point, the transaction_ID has a value "a".

(12) Upon receiving the AV/C response successfully, the 1394 node 101 returns a corresponding Ack message to the base station node 110.

In FIG. 6, only the MAC address and the Subunit_ID are described as the information of the packet transferred on the IEEE 802.11 network 20, but all information of the FCP frame is of course transmitted to the radio terminal 121.

FIG. 7 shows an exemplary form of the correspondence table to be maintained at the base station node 0.110. In FIG. 7, the values of "ctype", "Subunit_type" and "Subunit_ID" of the FCP frame and the MAC address of the radio terminal are used as the information for identifying the command on the IEEE 802.11 side. By storing these information, it is possible to identify what type of AV/C command has been transferred to which Sub Unit of which radio terminal. This is necessary in order to deal with the case where commands are transmitted from a plurality of 1394 nodes on the IEEE 1394 bus to Sub Units of a plurality of radio terminals on the IEEE 802.11 network.

As such, in the case of executing the AV/C protocol between the IEEE 1394 bus 10 and the IEEE 802.11 network. 20, it becomes possible to identify the 1394 node on the IEEE 1394 bus 10 corresponding to the AV/C response transmitted from the radio terminal by maintaining the correspondence table as shown in FIG. 7 at the base station node 110.

Note that FIG. 6 is directed to the case of transmitting the AV/C command from the 1394 node 101 on the IEEE 1394 bus 10 to the radio terminal 121, but it is also possible to execute the AV/C protocol across the IEEE 1394 bus and the IEEE 802.11 network in the case of transmitting the AV/C command in the opposite direction (the case of transmitting the AV/C command from the radio terminal 121 to the 1394 node 101, for example), using the similar correspondence table as that shown in FIG. 7.

It is obviously also possible to execute the AV/C protocol across the IEEE 1394 bus and the IEEE 802.11 network in both of the direction from the 1394 node on the IEEE 1394 bus to the radio terminal and the direction from the radio terminal to the 1394 node on the IEEE 1394 bus. In such a case, the same correspondence table can be used commonly in both the processing in the case of transmitting the AV/C command from the 1394 node on the IEEE 1394 bus to the radio terminal on the IEEE 802.11 network and the processing in the case of transmitting the AV/C command from the radio terminal on the IEEE 802.11 network to the 1394 node on the IEEE 1394 bus.

In such a case of utilizing the same correspondence table in both directions, it is also possible to add a field for indicating a transfer direction of the AV/C command as the information to be described in the correspondence table shown in FIG. 7, but this field for indicating the transfer direction is not absolutely necessary. Namely, the similar processing can be realized by detecting the transaction information on the IEEE 1394 bus side for the AV/C response received from the IEEE 802.11 network side by referring to the transaction information on the IEEE 802.11 network side in the correspondence table of FIG. 7, and conversely by detecting the transaction information on the IEEE 8020.11 network side for the AV/C response received from the IEEE 1394 bus side by referring to the transaction information on the IEEE 1394 bus side in the correspondence table of FIG. 7, for example.

It is also possible to execute different data transfer schemes depending on the transfer directions. (IEEE 1394→IEEE 802.11, IEEE 802.11→IEEE 1394). In such a case, the correspondence tables to be used in transmission of the AV/C command in respective directions can be maintained separately.

In the case of using different correspondence tables according to the transfer directions of the AV/C command, these correspondence tables may be given in different formats. For example, in the case of transmitting the AV/C command from the radio terminal on the IEEE 802.11 network to the 1394 node on the IEEE 1394 bus, the source 1394 node of the AV/C command transferred on the IEEE 1394 bus is always the base station node 110, so that the source node address information can be omitted from the information of the IEEE 1394 side in the correspondence table shown in FIG. 7.

Second Embodiment

By the scheme of the first embodiment, it becomes possible to extend the concept of the command/response of the AV/C protocol executed on the IEEE 1394 bus to the IEEE 802.11 network as well. However, the information on the IEEE 802.11 network side in the correspondence table of FIG. 7 that must be maintained by the base station node for this purpose can be quite large depending on the system configuration. Also, in order to be able to identify the 1394 node corresponding to the AV/C response perfectly, there may be cases where it is also necessary to maintain all the information (or nearly all the information) of the FCP frame. These facts imply not only the increase of the size of the correspondence table to be maintained at the base station node but also the need to check all the information of every AV/C command at the base station node, so that they lead to the increase of the processing load on the base station node.

As a method effective in evading such an increase of the memory capacity or the processing load when it is not permissible, it is possible to use a method in which the number of AV/C commands that can be transmitted from the base station node is always limited to be just one. This is a method in which the group of AV/C commands transmitted from a plurality of 1394 nodes on the IEEE 1394 bus to the radio terminals on the IEEE 802.11 network are serialized at a time of transfer at the base station node. As a result of such a serialization of the AV/C commands, it becomes sufficient for the base station node to maintain only the transaction information on the IEEE 1394 bus side corresponding to the transmitted AV/C command, instead of maintaining the correspondence table as shown in FIG. 7.

Here, as a concrete method for realizing such a serialization of the AV/C commands, there are various possible methods including a method of serialization such that only a single AV/C command is executed in the entire IEEE 802.11 network, a method of serialization with respect to each radio terminal connected to the base station node, a method of serialization with respect to each constituent element of the radio terminal on the IEEE 802.11 network, and a method of serialization with respect to each 1394 node transmitting the AV/C command. The processing sequence described below is directed to the case of using the method of serialization such that only a single AV/C command is executed in the entire IEEE 802.11 network, but the case of using the method of serialization with respect to each radio terminal, the case of using the method of serialization with respect to each constituent element, or the case of using the method of serialization with respect to each 1394 node can also be realized by the similar processing.

Figure 8:
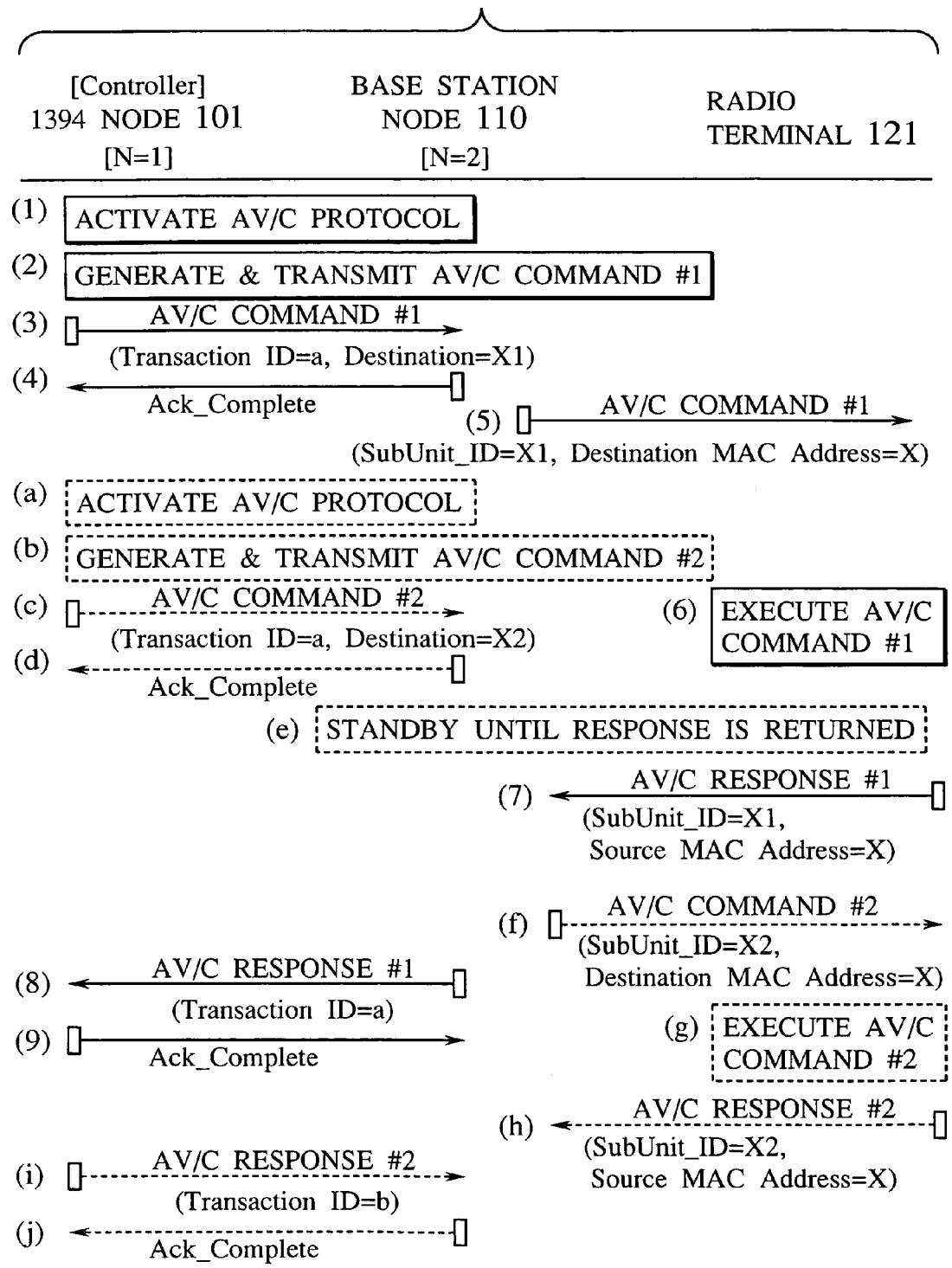
FIG. 8 is a sequence chart for an exemplary processing in the home network of FIG. 3 according to the second embodiment of the present invention.

FIG. 8 shows an exemplary processing sequence in the case of using the serialization such that only one AV/C command is executed in the entire IEEE 802.11 network.

FIG. 8 shows an exemplary case in which two AV/C commands (#1 and #2) are sequentially transmitted from the 1394 node 101, serialized at the base station node 110, and then sequentially transferred to the IEEE 802.11 network. In the following processing sequence, (1) to (9) constitute the processing procedure for the first transmitted AV/C command and (a) to (j) constitute the processing procedure for the second transmitted AV/C command.

(1) The application is activated and the AV/C protocol is executed at the 1394 node 101.

(2) The AV/C command #1 is generated and transmitted toward the Sub Unit X1 within the radio terminal 121 at the 1394 node 101.

(3) The FCP frame loaded with the AV/C command #1 is transferred from the 1394 node 101 to the base station node 110. At this point, the transaction_ID=a on the IEEE 1394 bus 10, and the destination Subunit_ID=X1 is described in the FCP frame.

(4) Upon receiving the AV/C command #1 successfully, the base station node 110 returns a corresponding Ack message to the 1394 node 101.

(5) At the base station node 110, it is ascertained that the destination radio terminal is the radio terminal 121, as the destination Subunit_ID of the received AV/C command #1 is X1, and the AV/C command #1 is transferred from the base station node 110 to the radio terminal 121. Here, the base station node 110 stores the value (N=1) of the node ID of the 1394 node and the value (=a) of the transaction ID corresponding to the transferred AV/C command #1.

(6) The radio terminal 121 executes the processing corresponding to the received AV/C command #1.

(7) The radio terminal 121 generates the AV/C response #1 for notifying the processing result of the executed AV/C command #1, and transfers it to the base station node 110 after loading it in the FCP frame.

(8) The base station node 110 transfers the received AV/C response #1 to the 1394 node 101 (N=1) that corresponds to the received AV/C response #1. At this point, the transaction_ID has a value "a".

(9) Upon receiving the AV/C response #1 successfully, the 1394 node 101 returns a corresponding Ack message to the base station node 110.

(a) The 1394 node 101 continues to execute the AV/C protocol.

(b) The next AV/C command #2 is generated and transmitted toward the Sub Unit X2 within the radio terminal 121 at the 1394 node 101.

(c) The FCP frame loaded with the AV/C command #2 is transferred from the 1394 node 101 to the base station node 110. At this point, the transaction_ID=b on the IEEE 1394 bus 10, and the destination Subunit_ID=X2 is described in the FCP frame.

(d) Upon receiving the AV/C command #2 successfully, the base station node 110 returns a corresponding Ack message to the 1394 node 101.

(e) At the base station node 110, it is ascertained that the destination radio terminal is the radio terminal 121, as the destination Subunit_ID of the received AV/C command #2 is X2. However, at this point, it is still in a state awaiting the AV/C response #1, so that the transfer of the AV/C command #2 is postponed until the AV/C response #1 is returned.

(f) Upon receiving the AV/C response #1, the base station node 110 transfers the AV/C command #2 to the radio terminal 121. Here, the base station node 110 stores the value (N=1) of the node ID of the 1394 node and the value (=b) of the transaction ID corresponding to the transferred AV/C command #2.

(g) The radio terminal 121 executes the processing corresponding to the received AV/C command #2.

(h) The radio terminal 121 generates the AV/C response #2 for notifying the processing result of the executed AV/C command #2, and transfers it to the base station node 110 after loading it in the FCP frame.

(i) The base station node 110 transfers the received AV/C response #2 to the 1394 node 101 (N=1) that corresponds to the received AV/C response #2. At this point, the transaction_ID has a value "b".

(j) Upon receiving the AV/C response #2 successfully, the 1394 node 101 returns a corresponding Ack message to the base station node 110.

By carrying out the above processing, it becomes possible to reduce a table capacity required at the base station node and an amount of processing to check AV/C commands at the base station node, compared with the first embodiment. Also, by the above processing for serializing AV/C commands, it becomes possible to identify a state of the radio terminal on the IEEE 802.11 network (the AV/C command corresponding to the processing currently executed by the radio terminal), so that it becomes possible to execute the AV/C protocol across the IEEE 1394 bus and the IEEE 802.11 network more smoothly.

Now, in the case of transmitting the AV/C commands by serializing them as described above, it is preferable to provide a handling in the case where the AV/C response corresponding to the transmitted AV/C command is not returned. For this handling, it is effective to use the command processing time (=100 msec) that is specified in the AV/C protocol as described above. Namely, after transmitting some AV/C command, if the corresponding AV/C response is not returned after an elapse of 100 msec, for example, the transmission of the next AV/C command may be permitted.

Figure 9:
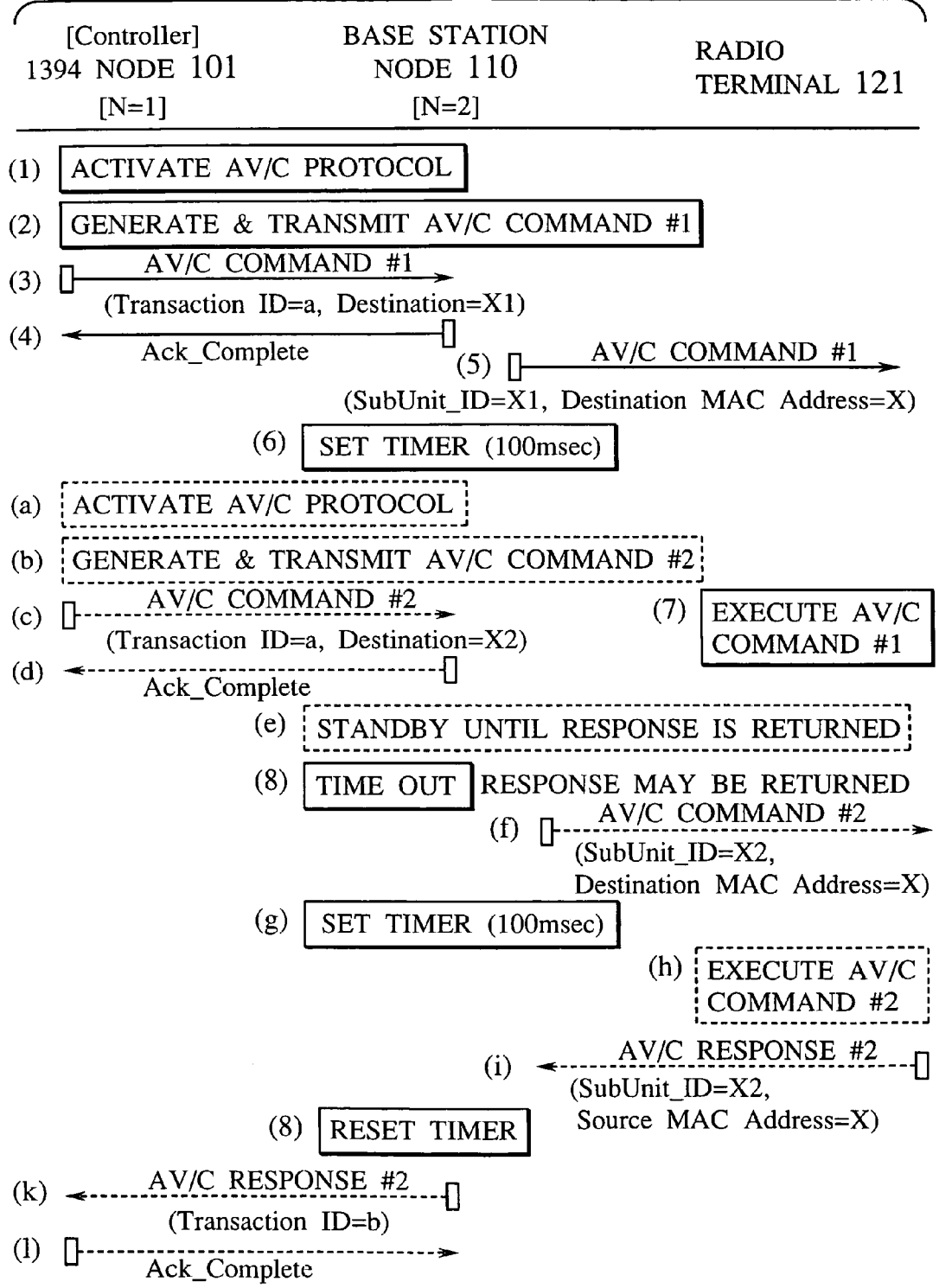
FIG. 9 is a sequence chart for an exemplary processing in the home network of FIG. 3 according to the third embodiment of the present invention.

FIG. 9 shows an exemplary processing sequence in this case.

FIG. 9 also shows an exemplary case in which two AV/C commands are transmitted similarly as in the case of FIG. 8. In the following processing sequence, (1) to (8) constitute the processing procedure for the first transmitted AV/C command and (a) to (1) constitute the processing procedure for the second transmitted AV/C command.

(1) The application is activated and the AV/C protocol is executed at the 1394 node 101.

(2) The AV/C command #1 is generated and transmitted toward the Sub Unit X1 within the radio terminal 121 at the 1394 node 101.

(3) The FCP frame loaded with the AV/C command #1 is transferred from the 1394 node 101 to the base station node 110. At this point, the transaction_ID=a on the IEEE 1394 bus 10, and the destination Subunit_ID=X1 is described in the FCP frame.

(4) Upon receiving the AV/C command #1 successfully, the base station node 110 returns a corresponding Ack message to the 1394 node 101.

(5) At the base station node 110, it is ascertained that the destination radio terminal is the radio terminal 121, as the destination Subunit_ID of the received AV/C command #1 is X1, and the AV/C command #1 is transferred from the base station node 110 to the radio terminal 121. Here, the base station node 110 stores the value (N=1) of the node ID of the 1394 node and the value (=a) of the transaction ID corresponding to the transferred AV/C command #1.

(6) A timer is started at a timing of transmitting the AV/C command #1.

(7) The radio terminal 121 executes the processing corresponding to the received AV/C command #1, but fails to return the corresponding AV/C response #1.

(8) At a timing of the time out, the transmission processing of the AV/C command #1 is finished. At this point, the fact that it is the time out may be notified to the corresponding 1394 node 101 (N=1).

(a) The 1394 node 101 continues to execute the AV/C protocol.

(b) The next AV/C command #2 is generated and transmitted toward the Sub Unit X2 within the radio terminal 121 at the 1394 node 101.

(c) The FCP frame loaded with the AV/C command #2 is transferred from the 1394 node 101 to the base station node 110. At this point, the transaction_ID=b on the IEEE 1394 bus 10, and the destination Subunit_ID=X2 is described in the FCP frame.

(d) Upon receiving the AV/C command #2 successfully, the base station node 110 returns a corresponding Ack message to the 1394 node 101.

(e) At the base station node 110, it is ascertained that the destination radio terminal is the radio terminal 121, as the destination Subunit_ID of the received AV/C command #2 is X2. However, at this point, it is still in a state in which the timer is set, so that the transfer of the AV/C command #2 is postponed until either the AV/C response #1 is returned or it becomes the time out.

(f) When the transmission processing of the AV/C command #1 becomes the time out, the base station node 110 carries out the postponed transfer of the AV/C command #2 to the radio terminal 121. Here, the base station node 110 stores the value (N=1) of the node ID of the 1394 node and the value (=b) of the transaction ID corresponding to the transferred AV/C command #2.

(g) A timer is started at a timing of transmitting the AV/C command #2.

(h) The radio terminal 121 executes the processing corresponding to the received AV/C command #2.

(i) The radio terminal 121 generates the AV/C response #2 for notifying the processing result of the executed AV/C command #2, and transfers it to the base station node 110 after loading it in the FCP frame.

(j) Upon receiving the AV/C response #2 from the radio terminal 121, the base station node 110 resets the timer.

(k) The base station node 110 transfers the received AV/C response #2 to the 1394 node 101 (N=1) that corresponds to the received AV/C response #2. At this point, the transaction_ID has a value "b".

(l) Upon receiving the AV/C response #2 successfully, the 1394 node 101 returns a corresponding Ack message to the base station node 110.

By using the processing for serializing the AV/C commands and the time out processing for the AV/C responses in combination at the base station node as described above, it becomes possible to execute the AV/C protocol across the IEEE 1394 bus and the IEEE 802.11 network more realistically.

Note that the above example is directed to the case where the protocol executed between the IEEE 1394 bus and the IEEE 802.11 network is the AV/C protocol, but the serialization processing of this embodiment is also applicable to the case of executing a protocol other than the AV/C protocol.

Note also that there can be cases where the time required in executing the corresponding processing may differ depending on types of protocols, and in such cases, it is preferable to adjust the time out setting according to the types of protocols rather than using the single fixed value such as 100 msec as described above. More specifically, in the case where the protocol executed on the IEEE 1394 bus uses the FCP frame, it is possible to adjust the time out setting according to the value of a "cts" field which is the protocol identifier of the FCP frame. In such a case, the base station node should maintain a correspondence table for the protocol to be executed and the time out setting.

The functions required at the base station node in the case of connecting the IEEE 1394 bus and the IEEE 802.11 network by such a method only include a function for storing the transaction information on the IEEE 1394 bus side corresponding to the transmitted AV/C command, and a timer function to be activated after transmitting the AV/C command, so that it is possible to suppress the number of functions to be added to the base station node. It is also possible to reduce the amount of processing to be carried out at a time of receiving the AV/C response compared with the first embodiment.

Note that FIG. 8 and FIG. 9 are directed to the case of transmitting the AV/C command from the 1394 node 101 on the IEEE 1394 bus 10 to the radio terminal 121, but similarly as in the first embodiment, it is also possible to execute the AV/C protocol across the IEEE 1394 bus and the IEEE 802.11 network in the case of transmitting the AV/C command in the opposite direction. It is obviously also possible to execute the AV/C protocol across the IEEE 1394 bus and the IEEE 802.11 network in both directions.

Third Embodiment

The first and second embodiments described above are directed to the case in which the AV/C response returned to the base station node is limited to a response corresponding to the AV/C command that was transmitted immediately previously, but there are also cases in which the AV/C response is returned from a device to be controlled when some specific event occurs at the device to be controlled. As an AV/C command that commands returning of the AV/C response according to such a state change, a type of command called Notify command is specified in the AV/C protocol, for example. In this third embodiment, a handling of the AV/C response corresponding to this Notify command will be described as an example.

As mentioned above, the Notify command is a command by which the controlling device requests a notification of an occurrence of a specific event to the device to be controlled. For example, a notification of an occurrence of insertion of a cassette tape into a cassette tape player is requested. In this case, the AV/C response as a processing result of the AV/C command will be returned when the specified event occurs, so that whether the returned AV/C response is a response to the Notify command or a response to the ordinary AV/C command (such as Control command or Status command) cannot be judged by using only the processing based on the time out setting of 100 msec or the processing for serializing AV/C commands described above.

In order to handle such cases, it is possible to use a method for changing the processing according to the command type of the AV/C protocol (the "ctype" field in the FCP frame structure of FIG. 5).

For example, at a time of transmitting the AV/C command from the base station node, if that AV/C command is the Notify command, the transaction on the IEEE 1394 bus side that corresponds to that Notify command will be identified by maintaining a correspondence table for a combination of (a part or a whole of) the FCP frame information and the destination MAC address in the base station node, as in the processing of the first embodiment. If that AV/C command is the other command such as Control command or Status command, the AV/C command will be transmitted by serializing AV/C commands (or the time out setting may be made), as in the processing of the second embodiment.

Then, when the AV/C response is received, whether the received AV/C response corresponds to a command stored in the correspondence table or not is checked first. If the received Av/C response corresponds to a command stored in the correspondence table, a node on the IEEE 1394 bus to which that response should be returned is identified by referring to the correspondence table (the processing in the first embodiment), and otherwise a node on the IEEE 1394 bus to which that response should be returned is recognized as a node on the IEEE 1394 bus that corresponds to the AV/C command that was transmitted immediately previously (the processing in the second embodiment).

In this third embodiment, it is sufficient to store only the information regarding the Notify command in the correspondence table maintained at the base station node, so that the required table capacity can be reduced compared with the first embodiment. Also, the stored information is limited to the information regarding the Notify command and therefore the information on "ctype" can be eliminated from the information necessary in the correspondence table (of FIG. 7), so that it is expected that the correspondence table can be made even smaller.

Here, events for which the above described Notify command transfer processing should be taken into account includes a bus reset of the IEEE 1394 bus. This is the case where the bus reset occurs on the IEEE 1394 bus while executing the AV/C protocol such that the value of the node ID of the 1394 node is changed. As a method for handling such a case, it is possible to use a method which maintains the EUI64 (Extended Unique Identifier; 64 bits) address of the 1394 node that transmitted the AV/C command rather than its node ID, as the information on the IEEE 1394 bus side in the correspondence table maintained at the base station node.

Using such a method, it becomes possible to identify the 1394 node that is the transfer target of the response even if the bus reset occurs on the 1394 bus after the AV/C command (Notify command, for example) is transmitted and before the corresponding response is returned.

Note however that, in the case of identifying the 1394 node by such an EUI64 address, there is a need for the base station node to maintain the correspondence table of the node ID and the EUI64 address of each node and executes the processing to update this correspondence table whenever the bus reset occurs. Consequently, as the processing after the bus reset on the IEEE 1394 bus, there is a need to execute the processing for collecting information on the EUI64 address of each 1394 node, apart from the ordinary automatic configuration recognition processing (such as Tree_ID processing, Self ID processing, for example).

By identifying the 1394 node on the IEEE 1394 bus side using the EUI64 address, it becomes possible to deal with the ordinary bus reset, and it also becomes possible to recognize the absence of the destination 1394 node on the IEEE 1394 bus accurately even when the 1394 node corresponding to the AV/C response had left the IEEE 1394 bus before the AV/C response is returned, so that there is a merit in that the transfer of the unnecessary response to the IEEE 1394 bus side can be eliminated. This method for using the EUI64 address of the 1394 node in identifying the 1394 node on the IEEE 1394 bus is applicable not only to this third embodiment but also to the first and second embodiments described above, or the fourth embodiment to be described below.

Note that this third embodiment is directed to the case of transmitting the AV/C command from the 1394 node 101 on the IEEE 1394 bus 10 to the radio terminal 121, but similarly as in the first and second embodiments, it is also applicable to the case of transmitting the AV/C command in the opposite direction. It is obviously also possible to execute the AV/C protocol across the IEEE 1394 bus and the IEEE 802.11 network in both directions.

Fourth Embodiment

This fourth embodiment is directed to a scheme for modifying the FCP frame in order to deal with the IEEE 802.11 network. Here, in order to provide a function corresponding to the serialization processing at the base station node described above, a field for attaching a sequence number indicating the order of transfer to the device to be controlled is added within the FCP frame. As a method for adding this field for attaching the sequence number, it is possible to use a method doe adding a new field or a method for utilizing the existing field.

In this fourth embodiment, a method for re-utilizing the "cts" field in the FCP frame as the sequence number field on the IEEE 802.11 network will be described as a method that modifies the FCP frame minimally, but it is also possible to use a method which allocates the sequence number field at arbitrary location within the FCP frame. In this fourth embodiment, it is assumed that only the AV/C protocol is executed as the AV control protocol on the IEEE 802.11 network, and the "cts" field is to be utilized as the sequence number field.

Figure 10:
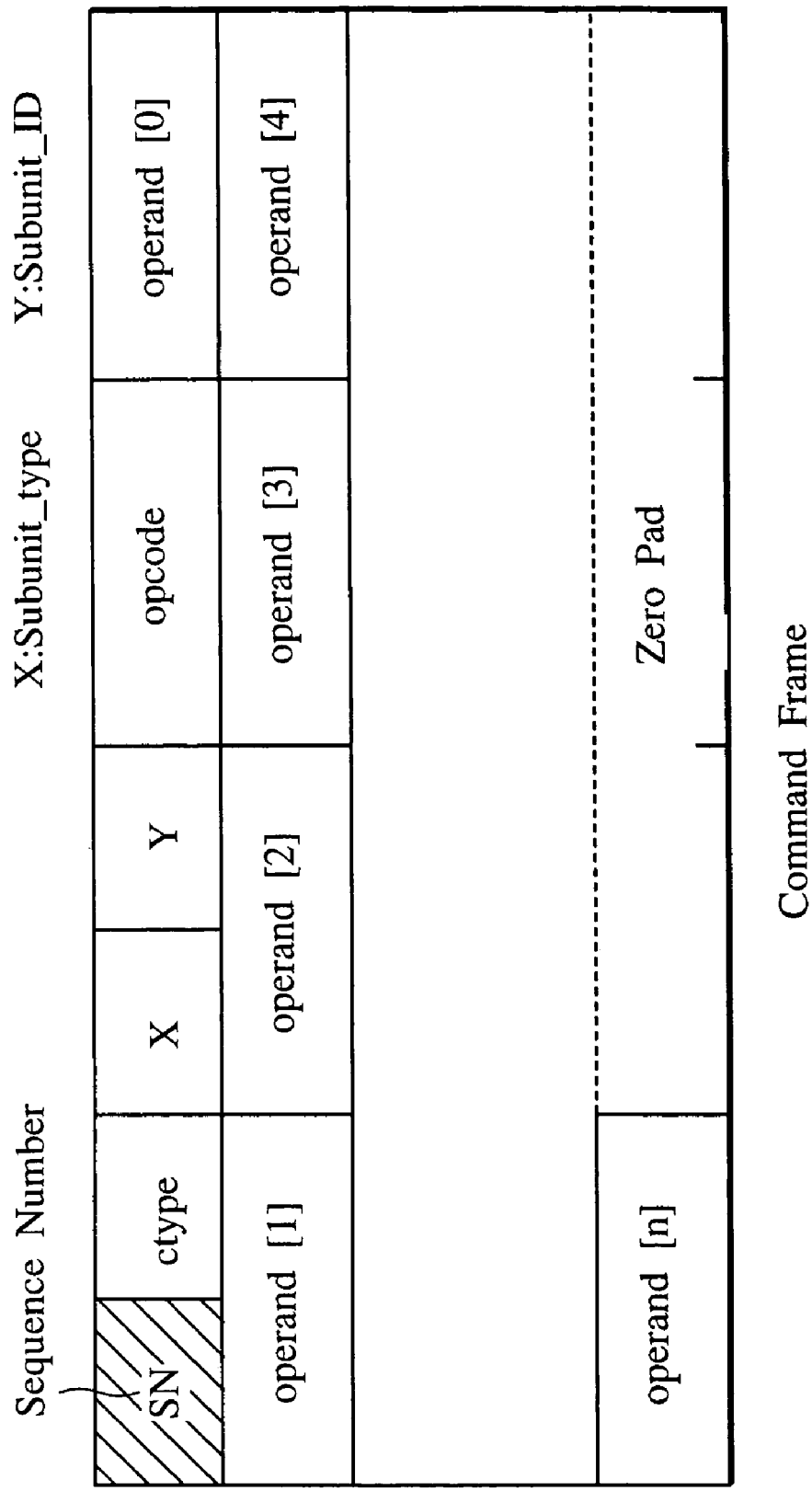
FIG. 10 is a diagram showing an exemplary frame structure of an FCP frame used in the fourth embodiment of the present invention.

FIG. 10 shows a configuration of the FCP frame to be used on the IEEE 802.11 network in this fourth embodiment. Note that the AV/C command/response is transferred by using the FCP frame with the same format as shown in FIG. 7 on the IEEE 1394 bus even in this fourth embodiment.

As shown in FIG. 10, in this fourth embodiment, the "cts" field that is usually used for identifying the protocol is utilized as the sequence number field on the IEEE 802.11 network. Then, using this sequence number and the MAC address of the destination radio terminal of the AV/C command, it becomes possible to uniquely identify the AV/C command that is transferred to the radio terminal on the IEEE 802.11 network. Here, in order to identify the AV/C response even more accurately, it is also possible to use a combination of the sequence number, the Subunit_type, Subunit_ID, and the MAC address of the destination radio terminal of the AV/C command.

Figure 11:
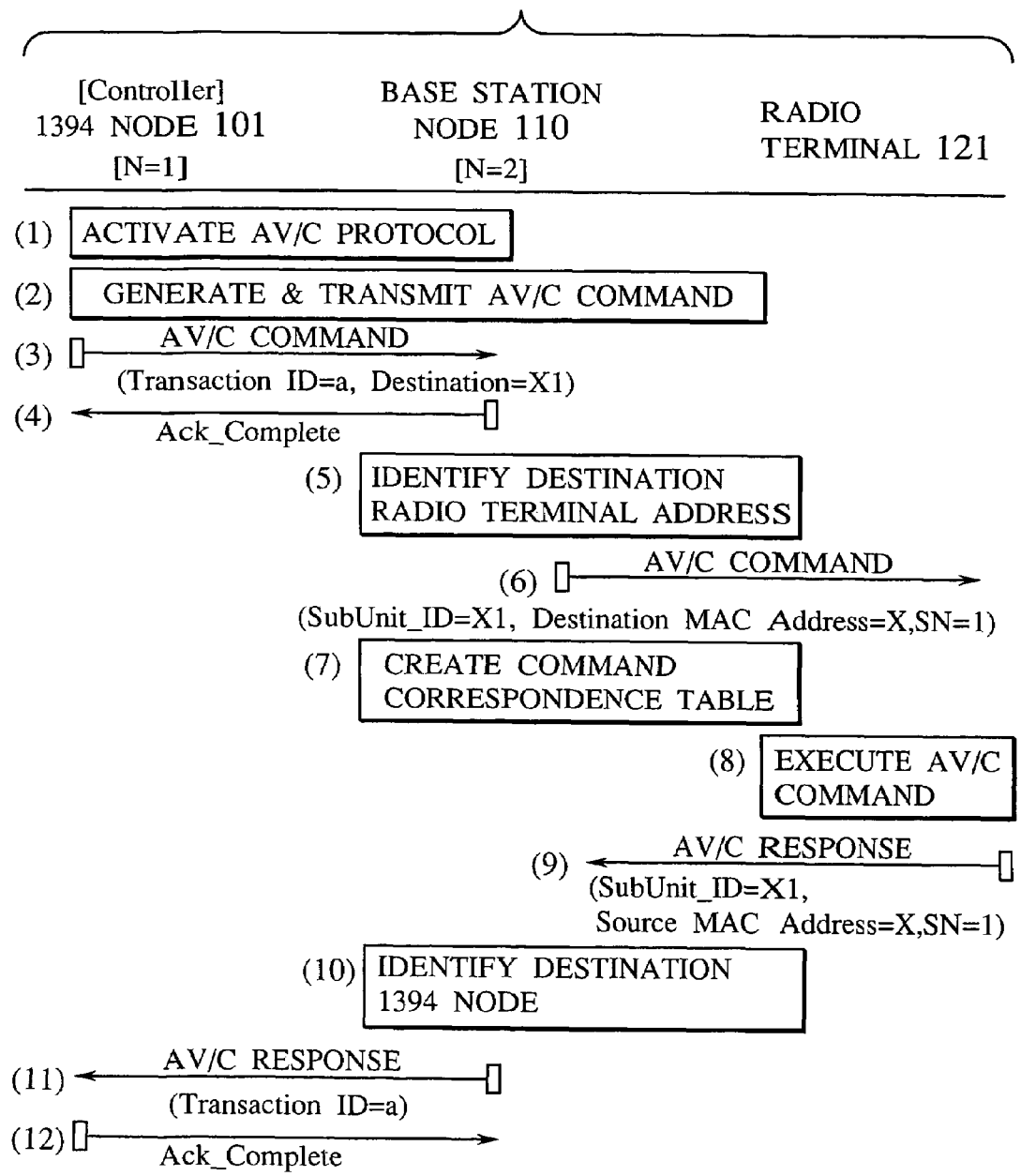
FIG. 11 is a sequence chart for an exemplary processing in the home network of FIG. 3 according to the fourth embodiment of the present invention.

FIG. 11 shows an exemplary processing sequence in the case of executing the AV/C protocol across the IEEE 1394 bus and the IEEE 802.11 network using the identification scheme of this fourth embodiment.

The following example is directed to the case of using the sequence number, the Subunit_ID and the MAC address as the command identifier on the IEEE 802.11 network, but it is also possible to use various other combinations. This processing sequence proceeds as follows.

(1) The application is activated and the AV/C protocol is executed at the 1394 node 101.

(2) The AV/C command is generated and transmitted toward the Sub Unit X1 within the radio terminal 121 at the 1394 node 101.

(3) The FCP frame loaded with the AV/C command is transferred from the 1394 node 101 to the base station node 110. At this point, the transaction_ID=a on the IEEE 1394 bus 10, and the destination Subunit_ID. =X1 is described in the FCP frame.

(4) Upon receiving the AV/C command successfully, the base station node 110 returns a corresponding Ack message to the 1394 node 101.

(5) At the base station node 110, it is ascertained that the destination radio terminal is the radio terminal 121, as the destination Subunit_ID of the received AV/C command is X1.

(6) The AV/C command is transferred from the base station node 110 to the radio terminal 121. At this point, the destination radio terminal MAC address=X, the Subunit_ID=X1, and the sequence number=1.

(7) At the base station node 11.0, the fact that the identifier on the IEEE 802.11 network 20 corresponding to the transmitted AV/C command is "Subunit_ID=X1+Sequence Number=1+MAC address=X", and the fact that the identifier on the IEEE 1394 bus 10 is "transaction_ID=a+1394 node address N=1" are stored, and a correspondence table for them is created.

(8) The radio terminal 121 executes the processing corresponding to the received AV/C command.

(9) The radio terminal 121 generates the AV/C response for notifying the processing result of the executed AV/C command, and transfers it to the base station node 110 after loading it in the FCP frame.

(10) The base station node 110 refers to the above described correspondence table, and ascertains that the received AV/C response corresponds to "transaction_ID=a on the IEEE 1394 bus+1394 node address N=1" from a combination of the values of the sequence number and the Subunit_ID in the FCP frame carrying the received AV/C response and the MAC address of the source radio terminal.

(11) The base station node 110 transfers the received AV/C response to the 1394 node 101 (N=1). At this point, the transaction_ID has a value "a".

(12) Upon receiving the AV/C response successfully, the 1394 node 101 returns a corresponding Ack message to the base station node 110.

The above processing sequence uses a scheme for attaching the sequence number with respect to each destination Sub Unit to which the AV/C command is to be transmitted, but besides that it is also possible to use a scheme for attaching the sequence number corresponding to all the AV/C commands transmitted from the base station node, a scheme for attaching the sequence number for each source 1394 node of the AV/C command, a scheme for attaching the sequence number for each constituent element, or a scheme for attaching the sequence number for each destination radio terminal of the AV/C command. By using this method for attaching the sequence number to the FCP frame, it becomes possible to reduce the required table capacity to be maintained at the base station node, and it also becomes possible to reduce the table referring processing to be executed by the base station node at a time of receiving the AV/C response.

Note that this fourth embodiment is directed to the case of transmitting the AV/C command from the 1394 node 101 on the IEEE 1394 bus 10 to the radio terminal 121, but similarly as in the first to third embodiments, it is also applicable to the case of transmitting the AV/C command in the opposite direction. It is obviously also possible to execute the AV/C protocol across the IEEE 1394 bus and the IEEE 802.11 network in both directions.

<Base Station Node Configuration>

Figure 12:
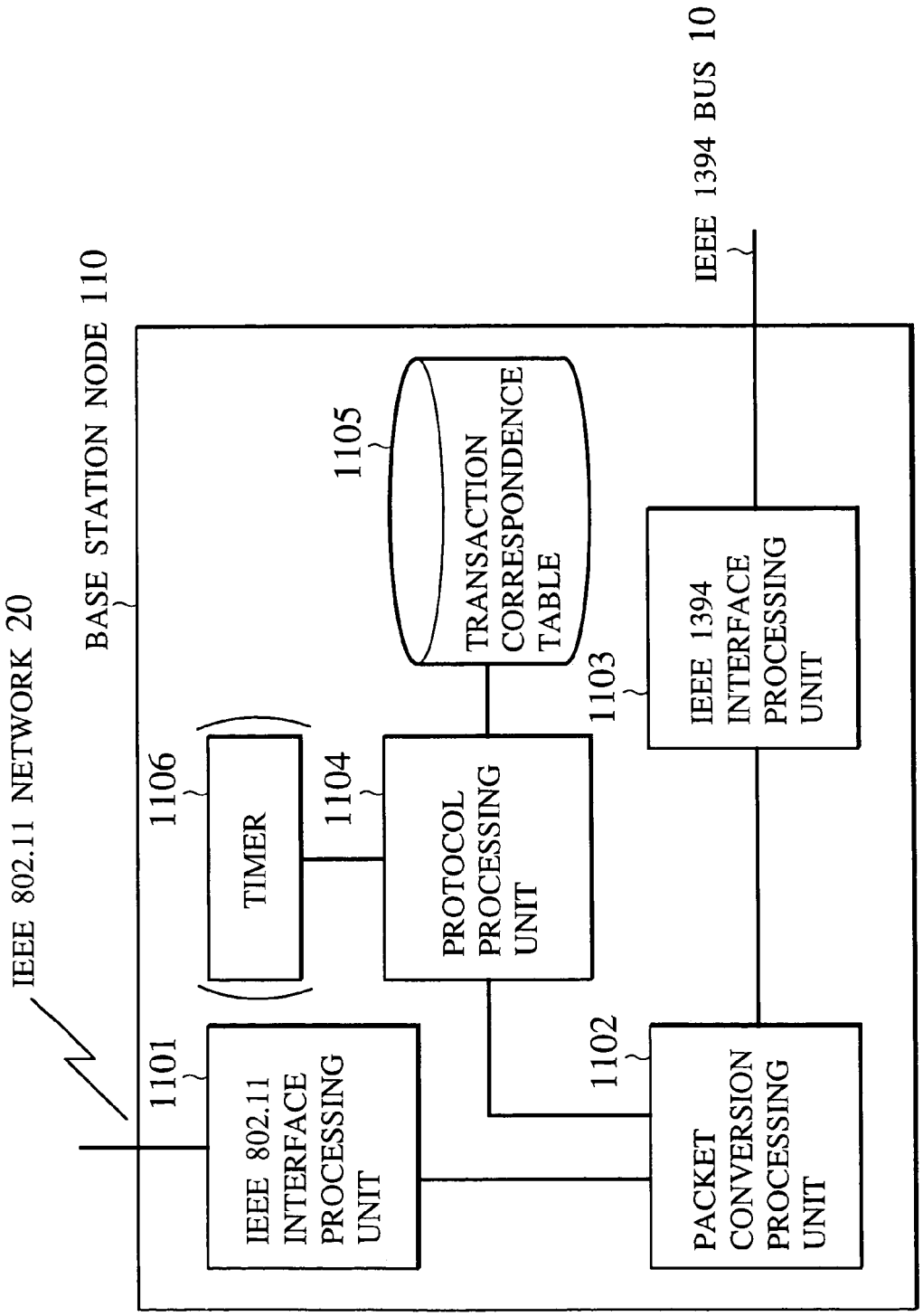
FIG. 12 is a block diagram showing an exemplary internal configuration of a communication according to the first to fourth embodiments of the present invention.

FIG. 12 shows an exemplary internal configuration of the base station node to be used in the first to fourth embodiments described above.

In the exemplary configuration of FIG. 12, the base station node suitable for the first and fourth embodiments has an IEEE 802.11 interface processing unit 1101, a packet conversion processing unit 1102, an IEEE 1394 interface processing unit 1103, a protocol processing unit 1104, and a transaction correspondence table 1105. In addition, the base station node suitable for the second and third embodiments also has a timer 1106.

Note that the base station node also obviously includes other functions for providing the normal base station node functions, but FIG. 12 only shows functions related to the features of the present invention.

The IEEE 802.11 interface processing unit 1101 is a unit for executing an interface processing with respect to the IEEE 802.11 network.

The packet conversion processing unit 1102 is a unit for executing a packet conversion processing between the IEEE 802.11 network and the IEEE 1394 bus.

The IEEE 1394 interface processing unit 1103 is a unit for executing an interface processing with respect to the IEEE 1394 bus.

The Protocol processing unit 1104 is a unit for executing a protocol processing in order to extend upper layer protocols executed on the IEEE 1394 bus and execute them on the IEEE 802.11 network.

Note that the constituent element notification unction for notifying at least a part of constituent elements in a node existing on one network as constituent elements of the own node to a node on another network is provided in this protocol processing unit 1104.

In addition, a node processing determining function for determining the processing procedure according to the packet type in the third embodiment (which determines to execute the processing of the first embodiment if the AV/C command is the Notify command or the processing of the second embodiment otherwise, for example) is also provided in this protocol processing unit 1104.

Also, in the second and third embodiments, buffers (not shown) provided in the packet conversion processing unit 1102 will be used for the serialization processing.

The transaction correspondence table 1105 is a table for storing correspondences between the transaction information on the IEEE 1394 bus and the transaction information on the IEEE 802.11 network.

Note that the information to be maintained in the transaction correspondence table 1105 is as described above in each embodiment.

The timer 1106 is provided in order to execute the time out processing as described in the second and third embodiments. Also, as mentioned above, there are cases where the timer 1106 is to be set for each protocol type separately.

By connecting the IEEE 1394 bus and the IEEE 802.11 network using the base station node in such a configuration, a protocol in which the processing is based on a combination of command and response such as the AV/C protocol executed on the IEEE 1394 bus can be executed across the IEEE 1394 bus and the IEEE 802.11 network.

As described, according to the present invention, it becomes possible to realize the interworking of a network in which data transfer is based on a combination of request and response and a network in which data transfer is not based on a combination of request and response.

According to the present invention, it is possible to use a combination of the MAC address on the IEEE 802.11 network and the destination Subunit_ID of the AV/C command as a transaction identifier on the IEEE 802.11 network corresponding to the transaction on the IEEE 1394 bus, for example. More generally, it is possible to use a correspondence among a message destination constituent element ID, a message destination terminal ID, and a message ID. More specifically, the correspondence table can store the correspondence in terms of a first transaction ID on the first network of the message and a second transaction ID on the second network of the message given by a combination of a destination terminal ID and a destination constituent element ID on the second network of the message.

Also, according to the present invention, the AV/C command transfer processing can be serialized at the connection function (base station node) between the IEEE 1394 bus and the IEEE 802.11 network such that a plurality of AV/C commands will not be transferred simultaneously on the IEEE 802.11 network, so that it is possible to conceal the transaction information on the IEEE 1394 bus.

Also, according to the present invention, the two types of processings described above can be used selectively according to the packet types.

According to the present invention, various information transferred on the IEEE 1394 bus can be transmitted to a terminal connected using a radio interface, so that it becomes possible to carry out data communications as if the connection to the IEEE 1394 bus is made by using the radio interface, for example. Also, it becomes possible to transmit various commands provided in the AV/C protocol properly, and it becomes possible to execute the AV/C protocol continually even when a state change such as a bus reset occurs on the IEEE 1394 bus side.

Note that the first to fourth embodiments described above can be realized in various combinations. For example, in the case of executing the AV/C protocol across the IEEE 1394 bus and the IEEE 802.11 network in both directions, the schemes of different embodiments may be used at a portion corresponding to the first direction for transmitting the AV/C command from the 1394 node on the IEEE 1394 bus to the radio terminal and a portion corresponding to the second direction for transmitting the AV/C command from the radio terminal to the 1394 node on the IEEE 1394 bus. As an example, it is possible to use the scheme of the third embodiment at a portion corresponding to the first direction and the scheme of the second embodiment at a portion corresponding to the second direction. Any other combinations are equally possible.

Also, the first to fourth embodiments are described above for a home network in which the IEEE 1394 bus provided in a home is connected with a radio terminal using a radio interface through the communication node of the present invention, but the present invention is applicable not only to the home network but also to LAN provided in the office or the other environment as well.

It is to be noted that the present invention is also equally applicable to the networks other than the IEEE 1394 bus and the IEEE 802.11 network, and the protocol other than the AV/C protocol. For example, USB can be used instead of the IEEE 1394 bus, any of Ethernet, HiperLAN, FDDI, and Bluetooth can be used instead of the IEEE 802.11 network, and SDP (Service Discovery Protocol) on the Bluetooth can be used instead of the AV/C protocol.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the base station node of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed:

1. A communication node, comprising:
   a first network interface for a first network in which data transfer is based on a combination of request and response;
   a second network interface for a second network in which data transfer is not based on a combination of request and response;
   a packet conversion processing means for applying a packet conversion processing to a first packet received by the first interface and obtain a second packet corresponding to the second network at a time of executing an application across the first network and the second network;
   a packet information memory means for storing an information on each second packet transmitted from the communication node;
   a packet transmission control means for serializing transmission of a plurality of second packets to the second network by referring to the packet information memory means such that after one second packet is transmitted to the second network, a next second packet is not transmitted to the second network until a response packet corresponding to said one second packet is received from the second network; and
   a constituent element notification means for notifying at least a part of constituent elements of each node existing on one of the first and second networks as constituent elements of the communication node to another one of the first and second networks.

2. The communication node of claim 1, wherein the packet transmission control means serializes the plurality of second packets with respect to the second network as a whole, each node on the second network, each constituent element on the second network, or each node on the first network.

3. The communication node of claim 1, wherein the packet transmission control means deletes the information on said one second packet stored in the packet information memory means upon receiving the response packet corresponding to said one second packet, and transmits the next second packet when the information on said one second packet is absent in the packet information memory means.

4. The communication node of claim 1, further comprising:
   a time out processing means to be activated at a time of transmitting each second packet, and for deleting the information on each second packet stored in the packet information memory means after a prescribed period of time elapsed.

5. The communication node of claim 4, wherein the prescribed period of time is set according to a type of the application executed across the first and second networks.

6. The communication node of claim 1, wherein the communication node executes both a first processing for transferring packets received from the first network to the second network and a second processing for transferring packets received from the second network to the first network.

7. The communication node of claim 6, wherein the communication node executes the first processing and the second processing by mutually different processing schemes.

8. The communication node of claim 1, wherein the first network is an IEEE 1394 bus.

9. The communication node of claim 1, wherein the second network is an IEEE 802.11 network.

10. The communication node of claim 1, wherein the first packet and the second packet are packets for transferring an AV/C command of an AV/C protocol, and the response packet is a packet for transferring an AV/C response of the AV/C protocol.

11. A communication node, comprising:
  a first network interface for a first network in which data transfer is based on a combination of request and response;
  a second network interface for a second network in which data transfer is not based on a combination of request and response;
  a packet conversion processing means for applying a packet conversion processing to a first packet received by the first interface and obtain a second packet corresponding to the second network at a time of executing an application across the first network and the second network;
  a packet correspondence memory means for storing a correspondence between the first packet and the second packet;
  a destination node identification means for identifying a destination node on the first network to which a response packet is to be transferred, by referring to the packet correspondence memory means using an information of the response packet at a time of receiving the response packet corresponding to the second packet by the second interface;
  a packet information memory means for storing an information on each second packet transmitted from the communication node;
  a packet transmission control means for serializing transmission of a plurality of second packets to the second network by referring to the packet information memory means such that after one second packet is transmitted to the second network, a next second packet is not transmitted to the second network until a response packet corresponding to said one second packet is received from the second network;
  a node processing determining means for determining a processing to be executed by the communication node as either a first processing using a combination of the packet correspondence memory means and the destination node identification means or a second processing using a combination of the packet information memory means and the packet transmission control means, according to a type of the first packet; and
  a constituent element notification means for notifying at least a part of constituent elements of each node existing on one of the first and second networks as constituent elements of the communication node to another one of the first and second networks.

12. The communication node of claim 11, wherein the packet transmission control means deletes the information on said one second packet stored in the packet information memory means upon receiving the response packet corresponding to said one second packet, and transmits the next second packet when the information on said one second packet is absent in the packet information memory means.

13. The communication node of claim 11, further comprising:
  a time out processing means to be activated at a time of transmitting each second packet, and for deleting the information on each second packet stored in the packet information memory means after a prescribed period of time elapsed.

14. The communication node of claim 13, wherein the prescribed period of time is set according to a type of the application executed across the first and second networks.

15. The communication node of claim 11, wherein the communication node executes both a first processing for transferring packets received from the first network to the second network and a second processing for transferring packets received from the second network to the first network.

16. The communication node of claim 15, wherein the communication node executes the first processing and the second processing by mutually different processing schemes.

17. The communication node of claim 11, wherein the first network is an IEEE 1394 bus.

18. The communication node of claim 11, wherein the second network is an IEEE 802.11 network.

19. The communication node of claim 11, wherein the first packet and the second packet are packets for transferring an AV/C command of an AV/C protocol, and the response packet is a packet for transferring an AV/C response of the AV/C protocol.

20. A computer usable medium having computer readable program codes embodied therein for causing a computer to function as a communication node having a first network interface for a first network in which data transfer is based on a combination of request and response and a second network interface for a second network in which data transfer is not based on a combination of request and response, the computer readable program codes include:
  a first computer readable program code for causing said computer to apply a packet conversion processing to a first packet received by the first interface and obtain a second packet corresponding to the second network at a time of executing an application across the first network and the second network;
  a second computer readable program code for causing said computer to store an information on each second packet transmitted from the communication node in a packet information memory;
  a third computer readable program code for causing said computer to serialize transmission of a plurality of second packets to the second network by referring to the packet information memory such that after one second packet is transmitted to the second network, a next second packet is not transmitted to the second network until a response packet corresponding to said one second packet is received from the second network; and
  a fourth computer readable program code for causing said computer to notify at least a part of constituent elements of each node existing on one of the first and second networks as constituent elements of the communication node to another one of the first and second networks.

21. A computer usable medium having computer readable program codes embodied therein for causing a computer to function as a communication node having a first network interface for a first network in which data transfer is based on a combination of request and response and a second network interface for a second network in which data transfer is not based on a combination of request and response, the computer readable program codes include:

a first computer readable program code for causing said computer to apply a packet conversion processing to a first packet received by the first interface and obtain a second packet corresponding to the second network at a time of executing an applications across the first network and the second network;

a second computer readable program code for causing said computer to store a correspondence between the first packet and the second packet in a packet correspondence memory;

a third computer readable program code for causing said computer to identify a destination node on the first network to which a response packet is to be transferred, by referring to the second computer readable program code using an information of the response packet at a time of receiving the response packet corresponding to the second packet by the second interface;

a fourth computer readable program code for causing said computer to store an information on each second packet transmitted from the communication node in a packet information memory;

a fifth computer readable program code for causing said computer to serialize transmission of a plurality of second packets to the second network by referring to the fourth computer readable program code such that after one second packet is transmitted to the second network, a next second packet is not transmitted to the second network until a response packet corresponding to said one second packet is received from the second network;

a sixth computer readable program code for causing said computer to determine a processing to be executed by the communication node as either a first processing using a combination of the packet correspondence memory and the third computer readable program code or a second processing using a combination of the packet information memory and the fifth computer readable program code, according to a type of the first packet; and a seventh computer readable program code for causing said computer to notify at least a part of constituent elements of each node existing on one of the first and second networks as constituent elements of the communication node to another one of the first and second networks.

22. A method of controlling a communication node having a first network interface for a first network in which data transfer is based on a combination of request and response and a second network interface for a second network in which data transfer is not based on a combination of request and response, the method comprising:

applying a packet conversion processing to a first packet received by the first interface and obtaining a second packet corresponding to the second network at a time of executing an application across the first network and the second network;

storing a correspondence between the first packet and the second packet in a packet correspondence memory; and identifying a destination node on the first network to which a response packet is to be transferred, by referring to the packet correspondence memory using an information of the response packet at a time of receiving the response packet corresponding to the second packet by the second interface.

23. A method for controlling a communication node having a first network interface for a first network in which data transfer is based on a combination of request and response and a second network interface for a second network in which data transfer is not based on a combination of request and response, the method comprising:

applying a packet conversion processing to a first packet received by the first interface and obtaining a second packet corresponding to the second network at a time of executing an application across the first network and the second network;

storing an information on each second packet transmitted from the communication node in a packet information memory;

serializing transmission of a plurality of second packets to the second network by referring to the packet information memory such that after one second packet is transmitted to the second network, a next second packet is not transmitted to the second network until a response packet corresponding to said one second packet is received from the second network; and notifying at least a part of constituent elements of each node existing on one of the first and second networks as constituent elements of the communication node to another one of the first and second networks.

24. A method for controlling a communication node having a first network interface for a first network in which data transfer is based on a combination of request and response and a second network interface for a second network in which data transfer is not based on a combination of request and response, the method comprising:

applying a packet conversion processing to a first packet received by the first interface and obtaining a second packet corresponding to the second network at a time of executing an application across the first network and the second network;

storing a correspondence between the first packet and the second packet in a packet correspondence memory;

identifying a destination node on the first network to which a response packet is to be transferred, by referring to the packet correspondence memory using an information of the response packet at a time of receiving the response packet corresponding to the second packet by the second interface;

storing an information on each second packet transmitted from the communication node in a packet information memory;

serializing transmission of a plurality of second packets to the second network by referring to the packet information memory such that after one second packet is transmitted to the second network, a next second packet is not transmitted to the second network until a response packet corresponding to said one second packet is received from the second network;

determining a processing to be executed by the communication node as either a first processing using a combination of the packet correspondence memory and the identifying step or a second processing using a combination of the packet information memory and the serializing step, according to a type of the first packet; and notifying at least a part of constituent elements of each node existing on one of the first and second networks as constituent elements of the communication node to another one of the first and second networks.

* * * * *

UNITED STATES PATENT AND TRADEMARK OFFICE
CERTIFICATE OF CORRECTION

PATENT NO. : 7,366,129 B2  Page 1 of 1
APPLICATION NO. : 10/773324
DATED : April 29, 2008
INVENTOR(S) : Takabatake It is certified that error appears in the above-identified patent and that said Letters Patent is hereby corrected as shown below:

On the title page, Item (75), the Inventor's First Name is incorrect. Item 75 should read:

Item -- (75)    Inventor:    Yoshiaki Takabatake, Kanagawa-ken (JP) --

Signed and Sealed this

Twenty-second Day of July, 2008

JON W. DUDAS
*Director of the United States Patent and Trademark Office*